United States Patent [19]

Wynn et al.

[11] Patent Number: 5,717,867
[45] Date of Patent: *Feb. 10, 1998

[54] EMPLOYEE TIME ENTRY AND ACCOUNTING SYSTEM

[75] Inventors: Stephen A. Wynn; Ernest R. Pearce; Michael H. D'Amico; Kathy A. Kalyvas; Edward C. Dahl; Ursula M. Conway, all of Las Vegas, Nev.

[73] Assignee: Mirage Resorts, Incorporated, Las Vegas, Nev.

[*] Notice: The term of this patent shall not extend beyond the expiration date of Pat. No. 5,459,657.

[21] Appl. No.: 541,112

[22] Filed: Oct. 11, 1995

Related U.S. Application Data

[63] Continuation of Ser. No. 81,217, Jun. 21, 1993, Pat. No. 5,459,657.
[51] Int. Cl.⁶ .................................................. G06F 17/60
[52] U.S. Cl. .................................................. 395/232
[58] Field of Search ...................... 364/401 R; 235/377; 346/86, 80; 395/232

[56] References Cited

U.S. PATENT DOCUMENTS

| 4,270,043 | 5/1981 | Baxter et al. |
| 4,506,274 | 3/1985 | Coe. |
| 4,812,627 | 3/1989 | Wexler et al. |
| 4,819,162 | 4/1989 | Webb, Jr. et al. |
| 5,255,183 | 10/1993 | Katz. |
| 5,459,657 | 10/1995 | Wynn et al. ................ 364/401 R |

*Primary Examiner*—Donald E. McElheny, Jr.
*Attorney, Agent, or Firm*—Knobbe, Martens, Olson & Bear, LLP

[57] ABSTRACT

A time entry and accounting system permitting employees to clock in and clock out from work at computerized time clocks located adjacent to their workstations using an individually encoded identification card. The time clock is configured to have a normally closed state and an opened state and to move between states in response to a supervisor scanning his identification card. The computerized time clocks are interactively linked to a central computer and, upon an employee clocking in or out, the central computer receives appropriate signals from the time clock, and stores information corresponding to these signals in memory. The information stored in the memory of the computer is subsequently used to develop accounting records and reports, to generate payroll data, and to send signals to the time clocks. The time clock further includes a display screen permitting the time clock to display messages in response to signals sent by the central computer and a plurality of buttons permitting an employee or supervisor to send additional information to the central computer.

24 Claims, 22 Drawing Sheets

FIG. 2
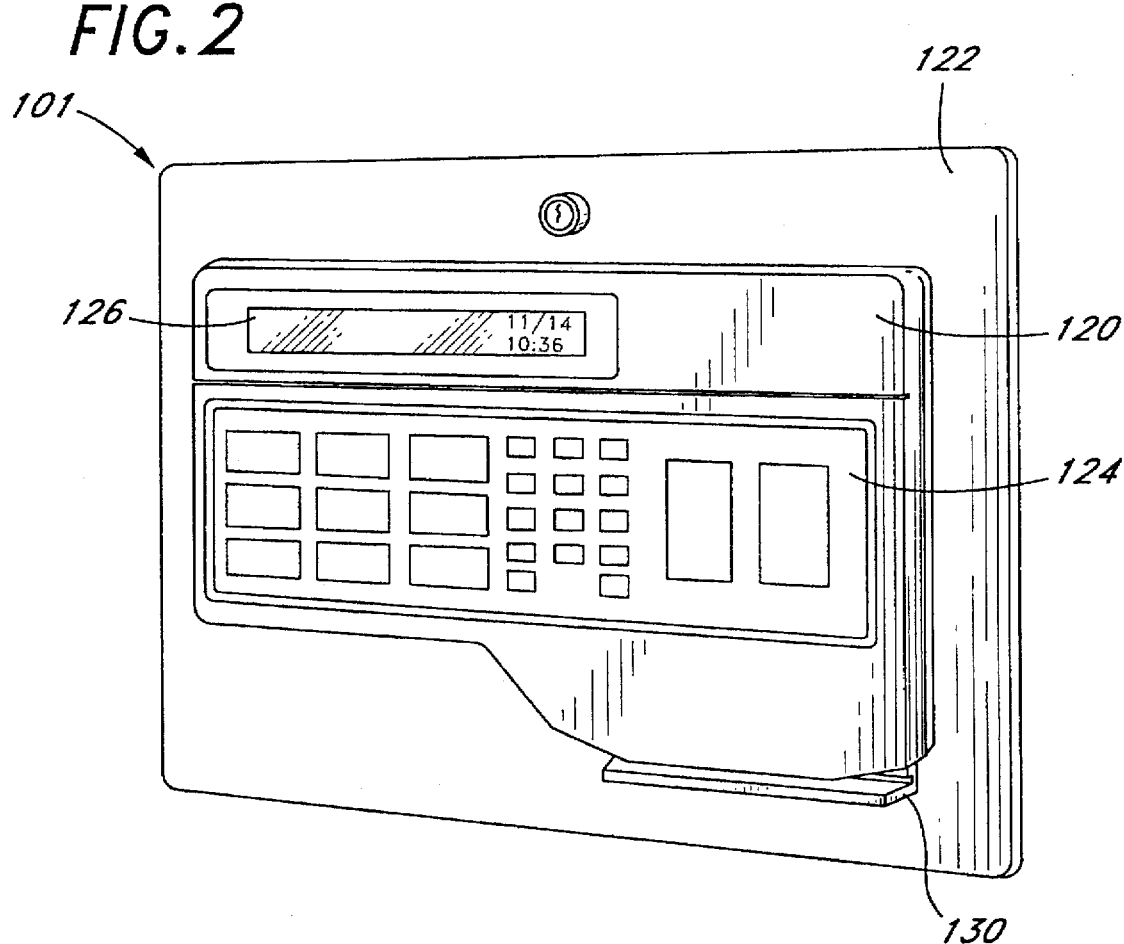
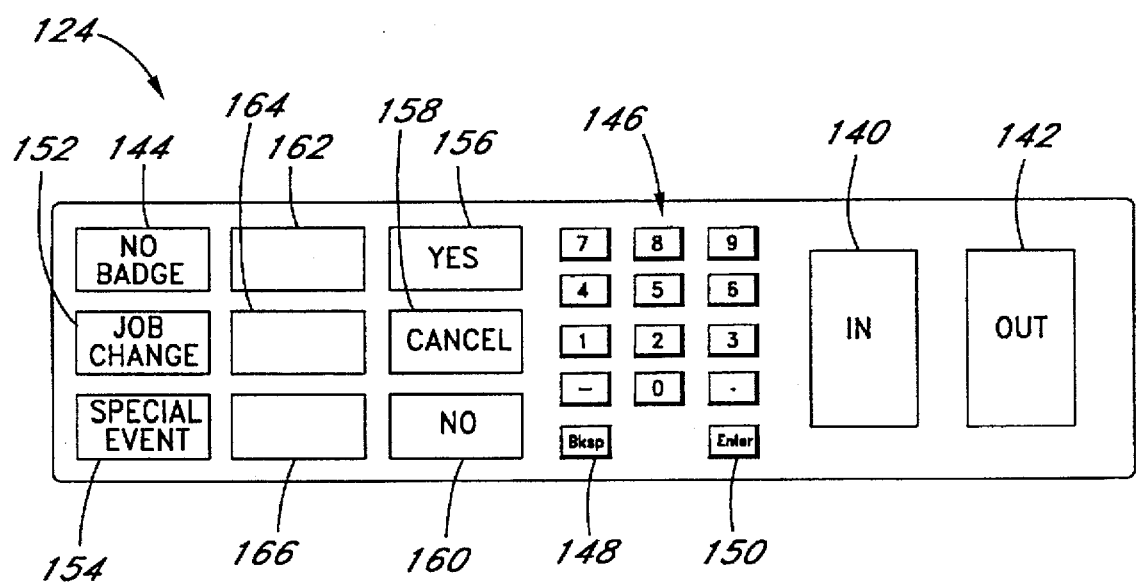
FIG. 2a

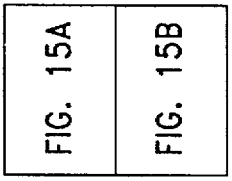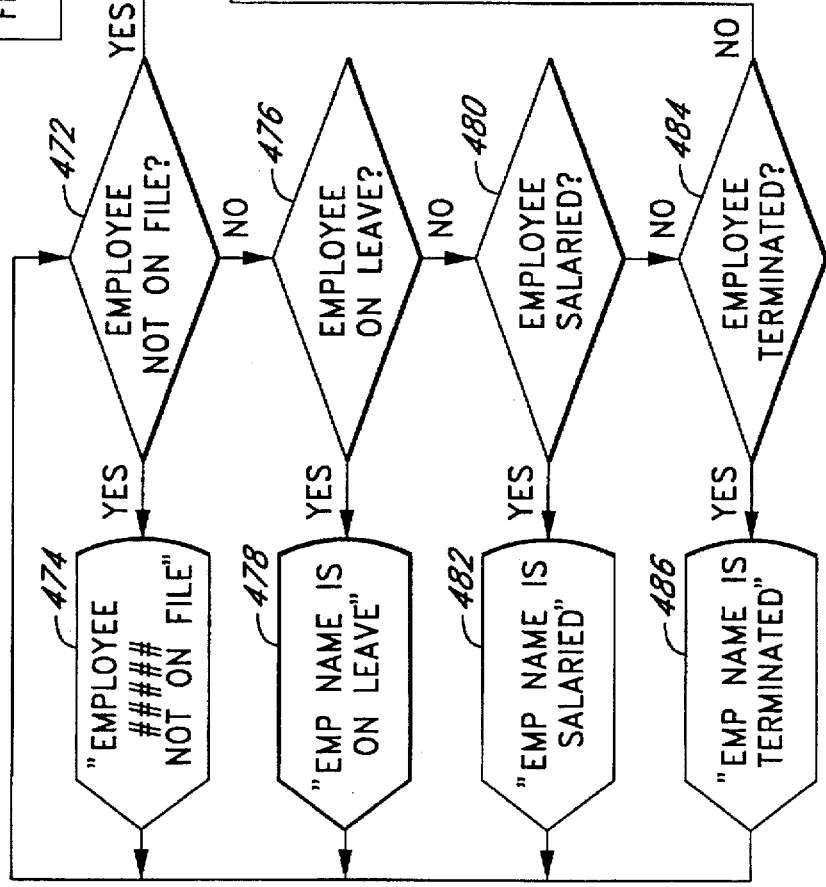

EMPLOYEE TIME ENTRY AND ACCOUNTING SYSTEM

This application is a continuation of U.S. patent application Ser. No. 08/081,217, filed Jun. 21, 1993, now U.S. Pat. No. 5,459,657.

A microfiche appendix containing computer source code is attached. The microfiche appendix comprises 4 sheets of microfiche having 189 frames, including one title frame.

The microfiche appendix contains material which is subject to copyright protection. The copyright owner has no objection to the reproduction of such material, as it appears in the files of the Patent and Trademark Office, but otherwise reserves all copyright rights whatsoever.

BACKGROUND OF THE INVENTION

1. Field of the Invention

The present invention generally relates to a system for entering and accumulating information about individual employees for accounting and payroll purposes. In particular, the present invention is concerned with a system for permitting employees to clock in and out from work on remotely located card reading time clocks, which are interactively connected to a central computer, and which are capable of displaying messages generated by the central computer.

2. Description of the Related Technology

The traditional manner an employer records and accounts for the time its hourly employees work is by keeping a daily log of the hours that each employee is present at the workplace. The hours that an employee works per day are typically determined by recording the time at which the employee arrives and leaves the workplace. The completed log is then given to an accounting department to determine accumulated wages earned by each employee for a given pay period.

In many workplaces, the employee is responsible for keeping track of his or her own arrival and departure times. The employee typically logs their arrival and departure time on a time sheet and a supervisor then verifies that the logged times are indeed accurate. In this method, a supervisor has to review the time sheets on a regular basis to ensure their accuracy, which can become a burdensome task if the supervisor has a large number of time sheets to review.

As an alternative to handwritten log entries, a time clock is often used to record the arrival and departure times of each employee at the workplace. Typically the employee will "punch" a time card on arrival and departure from the workplace, the time clock thereby date and time stamps the time card. However, the time clock has its own disadvantages. The supervisor still has to review the punched time cards for each employee to verify that the employee worked the hours he punched. The time clock does not reduce the amount of paper work that must be transmitted to the accounting department for the ultimate good of preparing the employee's paycheck. Even with the time clock, an individual time card for each employee must be collected and delivered to the accounting department where the time data is manually input into either accounting ledgers or a computer system.

Furthermore, there is often only one time clock which is located at the employee's entrance or in a location where the employees don't actually work, e.g., in a lunch room or in a locker room. It often takes a significant amount of time for an employee to transit between the location of the time clock and their actual work station and, hence, employees are often paid for time that they did not actually work. From the employer's perspective, the money paid to the employee for such non-productive time is wasteful.

If the employer employs a large number of hourly employees, the amount of money paid for non-productive time can constitute a significant sum. Generally, the only way that the employer can minimize the amount of non-productive time is for the supervisors of the employees to require the employees be at their assigned posts as soon as possible after clocking in. This mandate, however, can result in poor relations between supervisors and employees. Further, the supervisor may end up spending an inordinate amount of time attempting to get employees to their work stations when they could be performing other, more valuable, tasks.

Another problem with traditional time entry and accounting systems is that they are inflexible. Oftentimes any change in routine will require additional work by supervisors and a substantial amount of paper work. For example, in workplaces which employ many hourly workers performing different jobs, an employee hired and paid to perform one job may be asked to perform a different job during the course of a workday. In many cases, rules established by the employer through collective bargaining agreements, or in response to governmental regulations require that a worker performing a job different than the one they were originally hired to perform, be paid a different hourly wage. These changes can result in additional paper work for the supervisor who is authorizing the change as well as additional work for the accounting department who must change the accounting records accordingly. For example, the supervisor must approve of the transfer based on the qualifications of the worker, and inform the accounting department of the change and the hours worked so that the accounting department can properly adjust the employee's pay. The employee may be working for a different supervisor than usual. Hence, this new supervisor will also have to review the hours that the employee logged on a time sheet to verify the accuracy of the hours.

Similarly, in many workplaces where employees are working for different departments or on different projects, there may be a need to keep track of the amount of money that each of the various departments or projects are costing the company. Again, if an employee is working for a department or project other than the one to which they were originally assigned, or if an employee is working on a special project, extra paper work is generated so that the accounting department can account for the hours the employee works on a particular project.

A further disadvantage of prior timekeeping systems, and in large workplaces especially, is that interaction between the management and the employees at the beginning and end of shifts is limited. Clearly, the time when an employee is either arriving or leaving work is an ideal time to either pass information to or receive information from the employee. In some workplaces, the supervisor is required to be present at the time clock when the employee is logging in or out for just this purpose. However, even in these workplaces, the supervisor is unable to pass current information between the employee and management at that time as typically, the supervisor is out of contact with management. In very large companies, if management, or the accounting department, wishes to either pass information along to the employee or obtain information from the employee, the management must inform the supervisor a day in advance in order for the supervisor to be able to contact the employee.

Additionally, employers oftentimes provide their employees with an on-site cafeteria where the employees are permitted to purchase food and drinks during the course of the workday. Sometimes, the employers will provide a meal to the employees during the course of their working hours either for free or for a subsidized price. In certain companies, the employer will also permit the employee to pay for items purchased by having the aggregate amount taken out of their pay check at the end of the pay period. Oftentimes, the employee is only entitled to a meal if he is working a specific shift, or only when he has worked a requisite number of hours.

In these workplaces there is a need to account for the value of the items purchased or consumed by the employee. In traditional accounting systems, additional paper work must be generated to ensure that the proper amount is deducted from the paycheck of the employee, or to keep track of the number of meals that the employee has consumed. This paper work then must be interpreted by the accounting department and entered into the correct accounting ledger or computer so that the records are accurately maintained. In many workplaces providing such a service, the employee's supervisor must review the cafeteria records to ensure that the employee in his department or division was entitled to a meal in the cafeteria. This review of the cafeteria records can be yet another burdensome paper work task for the supervisor. Finally, the records generated in the cafeteria for each employee must then be transmitted to the accounting department for manual entry into either accounting ledgers or a computerized system.

Hence, a need exists for a timekeeping and accounting system that accounts for the hours that each employee has worked on any of multiple assignments, and the incidental items and expenses that an employee may have deducted out of his pay, e.g., meals etc. The system should prevent generation of many separate pieces of paper work for each individual employee, and the supervisor's concomitant review. There is also a need for a timekeeping system which more accurately reflects the actual amount of time the employee worked. Further, there is also a need for a timekeeping system which can pass and receive information to and from employees while the employee is either logging in or out. Finally, there is a need for an integrated accounting system which can be used to automatically generate accounting records for both employee attendance as well as for the fringe benefits provided by the employer such as cafeterias.

SUMMARY OF THE INVENTION

The aforementioned needs are satisfied by the present invention which includes a timekeeping and accounting system comprised of an individualized identification card for each hourly employee, a plurality of card reading time clocks located near employee work stations, and a central computer which receives and stores data provided by the card reading time clocks. The computer can be used to generate pay checks and other employee related reports. The time clock also preferably receives signals from the computer, which cause the time clock to display messages display to the supervisor, and a means by which the supervisor can responsively input information about a specific employee. The information input by the supervisor may include authorization for the employee to work overtime, authorization to work and be paid for a different job, deductions for meals and the like.

One significant aspect of the present invention is that each of the time clocks only reads cards input by the employees after the time clock has been opened or enabled by the supervisor in charge of that specific area. This permits the supervisor to be present when the employee logs into and out of work thus enabling the supervisor to interact with the employee and also enabling the supervisor to verify that the hours logged by the employee are in fact accurate. Further, since the time clocks are equipped with additional input means, preferably in the form of switches and buttons, the supervisor can make on-the-spot authorizations for overtime and job changes as well as enter the employees time into specific accounting files within the central computer without reviewing or generating any additional paper work. Additionally, since the time clock is directly connected to the computer all the information entered at the time clock is directly entered into the correct computer file almost instantaneously without generating any additional paper work.

A further aspect of the present invention is that the card readers can be installed in cafeterias or like places. These card readers can then be configured to send a signal to the computer indicative of the meals consumed by the employee for accounting purposes. This provides an efficient system of accounting for these types of charges which does not require a tremendous amount of additional paper work.

These and other objects and features of the present invention will become more fully apparent from the following description and appended claims taken in conjunction with the accompanying drawings.

BRIEF DESCRIPTION OF THE DRAWINGS

FIG. 2 is a front perspective view of a typical time clock of the time and attendance system of FIG. 1;

FIG. 2a is a front plan view of a keypad panel of the typical time clock shown in FIG. 2;

FIG. 3b is a rear view of the identification badge shown in FIG. 3a;

FIGS. 15, 15a, 15b are a flow diagram of a function performed by a time clock of the time and attendance system shown in FIG. 1 as it evaluates whether specific exceptions requiring supervisor approval apply to the employee who has just clocked in or out while the time clock is performing the basic operation shown in FIG. 9;

DETAILED DESCRIPTION OF THE PREFERRED EMBODIMENTS

Reference is now made to the drawings wherein like numerals refer to like parts throughout. The components of the time and attendance system, along with their basic operation will initially be described in the SYSTEM OVERVIEW Section. The description of the components of the time and attendance system will be followed by a description of the manner in which data is organized and accessed within the memory of the time and attendance system and how this data is then used in the TIME AND ATTENDANCE DATA ACCESS AND STORAGE Section. Finally, the operation of the programmable time clocks will be described in the TIMECLOCK OPERATION Section.

I. SYSTEM OVERVIEW

Figure 1:
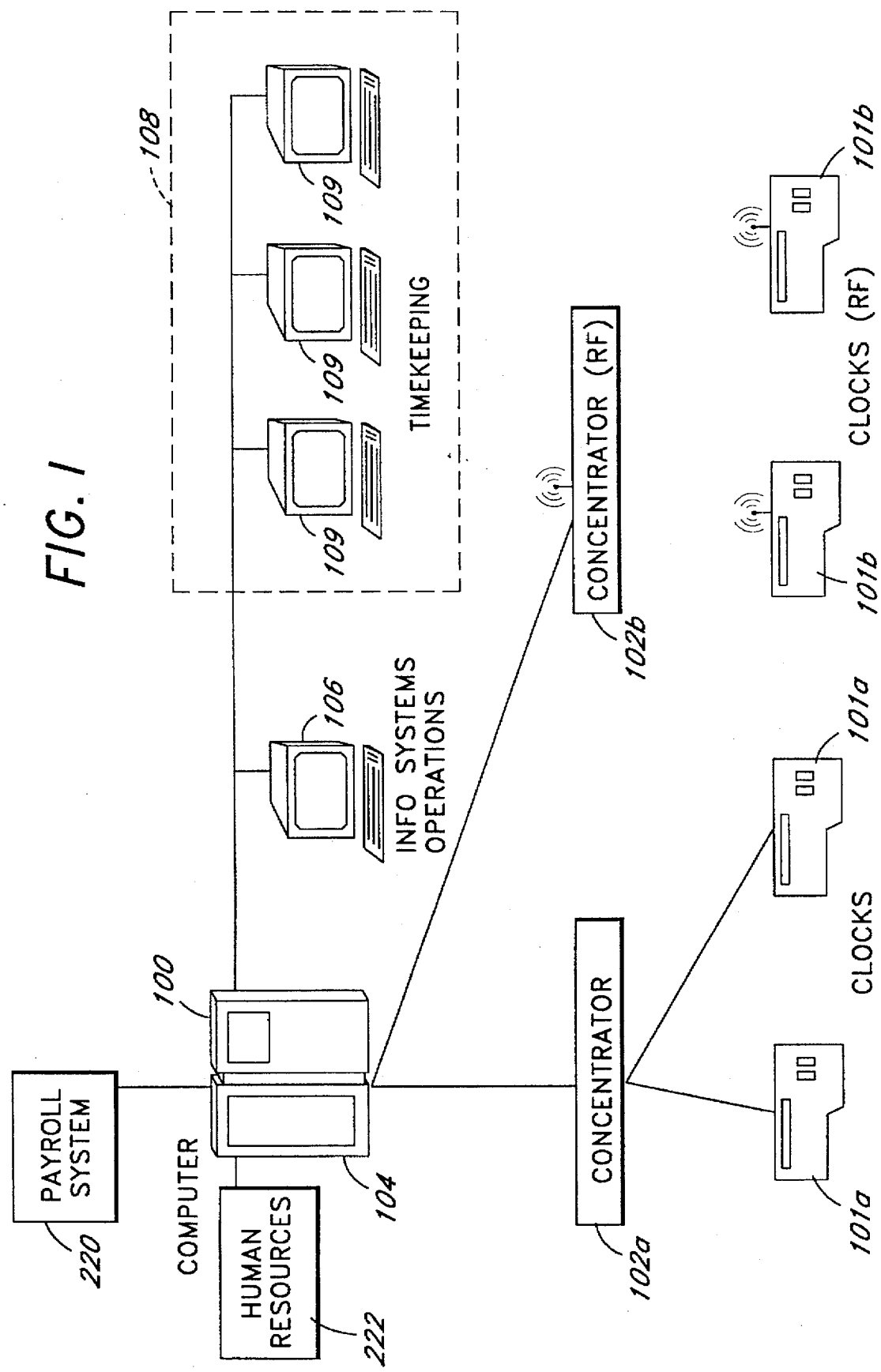
FIG. 1 is a top-level block diagram of one presently preferred time and attendance system of the present invention.

FIG. 1 is a block diagram showing the basic components of one presently preferred time and attendance system 100. The time and attendance system 100 includes a plurality of time clocks 101a and/or 101b located throughout the premises of the workplace, preferably adjacent to the location of the employees' work station. The workplace is thus preferably divided into distinct time clock zones so that employees working in a specific time clock zone clock in and out using a time clock 101 mounted in the time clock zone. In this preferred embodiment, the time clocks 101 include a programmable microprocessor, a card reader configured to read encoded identification cards, an internal clock system capable of keeping track of the current date and time, a display screen and a plurality of buttons. The time clocks 101 are also preferably capable of recording information, such as clock in and clock out times for multiple employees, transmitting this information to other components of time and attendance system 100 and receiving and displaying additional information provided by other components within the time and attendance system 100. In this preferred embodiment, the time clocks 101 are almost identical to the Model 9560A time clock manufactured by Intermec Corporation of Everett, Wash. with some modifications which are described with reference to FIGS. 2 and 3 below.

The time clocks 101 are either configured to be hard-wired time clocks 101a or radio frequency (RF) time clocks 101b. The hard-wired time clocks 101a are mounted in positions in the workplace where they can be connected to the rest of the system 100 using standard communication wiring. The RF time clocks 101b, however, are typically mounted in locations in the workplace where it would be impractical to run communication wiring. For example, in a workplace where some of the employee work stations are in the middle of a large open space, it may be impractical to run communication wiring to a time clock 101 located therein due to the lack of a suitable surface for the wiring or conditions in the work space which might result in damage to the wiring. For example, in a large open space, floor mounted communication wiring may be inadvertently dislodged by persons walking across the floor. In these locations, the RF time clocks 101b are used to communicate with the rest of the time and attendance system 100 via a radio transmitter/receiver (not shown), such as a Model 9189 radio transmitter/receiver also manufactured by the Intermec Corporation, which is specifically configured to send and receive signals to and from the Model 6560 time clock. Note some of either the hard wired time clocks 101a or the RF time clocks 101b are located within cafeterias in the workplace. These clocks are programmed to send and receive information relating to employees' use of the cafeteria and their operation is described in greater detail below in reference to FIG. 21.

The hard-wired time clocks 101a are electrically connected to a series of concentrators 102a, such as an Intermec Model 9161 concentrator. Preferably, up to 16 time clocks 101a can be connected to a single concentrator 102a. The time clocks 101a preferably transmit and receive data from the concentrator 102a at 9600 baud using an RS-422 interface and a polling mode D protocol. The polling mode D protocol is a half duplex, solicited asynchronous protocol more fully described in Section 3 of Intermec's "9560 Transaction Manager User's Manual". The polling mode D protocol permits one way communication between the concentrators 102a and one of the clocks 101 at any one time.

Other communication rates, interfaces, and protocols can also be used to connect these devices.

The RF time clocks 101b transmit signals to, and receive signals from a series of concentrators 102b using RF signals in the band range of 906–924 Mhz. The concentrators 102b also include a radio frequency transmitter/receiver such as a Intermec Model 9181 transmitter/receiver. Further, to enhance communication between the concentrators 102b and the time clocks 101b, radio frequency repeaters such as Intermec Model 9183 repeaters are located throughout the workplace. Each of the time clocks 101b is assigned a specific band or series of bands within the aforementioned bandwidth and the concentrator 102b communicates with the time clocks 101b using the same polling mode D protocol described above.

The concentrators 102a and 102b are then connected to a computer 104 using standard communication wiring techniques and a well known communication interface such as RS-232. The computer 104 is preferably a VLX, CLX or Cyclone manufactured by Tandem Computer. The computer 104 receives and stores information from the time clocks 101 including data indicating when each employee has clocked in and out as well as other data from the time clocks 101 resulting from either a supervisor or an employee pushing the buttons mounted on the time clock 101.

The computer 104 processes this information and stores it into files for later processing. Such processing includes generating signals back to the time clocks 101 requiring supervisor approval of special work, and creating records for payroll and accounting purposes. The organization of data within the computer 104 is described in greater detail in reference to FIG. 4 below.

A personal computer (PC) 106, which is dedicated for information systems operations, is connected to the computer 104. The personal computer 106 is preferably a commercially available IBM compatible personal computer. The personal computer 106 is used by a system operator (not shown) to monitor and troubleshoot the operation of the time and attendance system 100 and to control various aspects of the system, such as enabling or disabling certain time clocks 101 at specific times. For example, in this preferred embodiment, each of the time clocks 101 are programmed to send signals to the computer 104 at selected intervals, e.g., 10 minutes, when the time clocks 101 are not in use, signalling that the time clocks 101 are on-line. The computer 104 is programmed to detect when a specific time clock 101 has not sent an on-line message to then display a message to the system operator on the personal computer 106 indicating that one of the time clocks 101 has gone off-line. At that point, the system operator can implement corrective action.

Also connected to the computer 104 are a series of personal computers 109 which are used by a timekeeping department 108 to keep track of the hours that have been logged by individual employees and to perform other accounting tasks. The computers 109 are similar to the computer 106, and are standard commercially available IBM compatible PCs. The computers 109 can retrieve and store data and instructions in the memory of the computer 104 for future processing. The operation of the computers 109 in relation to the rest of the system 100 is described in greater detail with reference to FIGS. 4 through 8 below.

Referring now to FIG. 2, one presently preferred embodiment of a typical wall mounted time clock 101 will be described. The time clock 101 includes a casing 120, containing the electronic circuitry of the time clock 101, mounted upon a locking frame 122. The locking frame 122 secures the time clock 101 to a wall or other vertical surface, and is the subject of assignee's co-pending application entitled "Apparatus and Method for a Wall-Mounted Hardware System" which is incorporated herein by reference, and has been filed concurrently with the present application. The time clock 101 further contains a 24-character LCD display 126 which, in this preferred embodiment, is a modification of the standard 40-character two line, back lit LCD provided in the Intermec Model 9560A time clock.

The presently preferred time clock 101 is further modified from the standard Intermec 9560A time clock in that the amount of backlighting of the LCD display 126 can be varied to account for different lighting conditions within the workplace. A keypad 124 is mounted on the casing 120 and contains a plurality of buttons, manipulation of which results in signals being transmitted from the time clock 101 to the computer 104. The operations performed by the individual buttons of the keypad 124 is described in greater detail with reference to FIG. 2a below.

The time clock 101 also contains a card slot or swipe scanner 130 configured to read the identification badges or ID cards 170 (FIG. 3a and 3b) assigned to each of the employees. The slot scanner 130 uses either infrared or visible light to scan bar codes imprinted on the identification badges 170 to thereby determine which of the employees is presenting the identification badge 170. Preferably, the scanner 130 of the time clock 101 is always triggered, in that it is always enabled and capable of reading an ID card 170. The actual operation of the scanner 130 in conjunction with the identification badges or cards assigned to the employees is described in greater detail with reference to FIGS. 3a and 3b below.

FIG. 2a shows the layout of the keypad 124 of the time clock 101 shown in FIG. 2. The keypad 124 in the presently preferred embodiment represents another slight modification of the Intermec Model 9560A keypad as the keypad 124 is partially backlit, and the amount of the backlighting can also be varied by the user to account for different lighting in a similar way to the backlighting of the LCD display 126.

The basic operations performed by use of the individual buttons will now be described. In the presently preferred embodiment, a supervisor (not shown) first enables or "opens" the time clock 101 by scanning or swiping his ID card 170 through the slot scanner 130. Subsequently, if an employee (not shown) is beginning work, the employee or the supervisor depresses an IN button 140 signalling that the employee is clocking in. The employee then clocks in by scanning his ID card 170 (FIGS. 3a and 3b) through the slot scanner 130 (FIG. 2). If the employee is clocking out of work, the employee or the supervisor, after the supervisor has opened the time clock 101, depresses an OUT button 142 and scans his ID card 170 in the slot scanner 130 to clock out.

If an employee has not brought or has not been assigned an ID badge, the supervisor, after opening the time clock 101, then depresses a NO BADGE button 144. The LCD display screen 126 then prompts the supervisor to enter the identification number assigned to the employee by using a set of numerical buttons 146. The supervisor can edit any mistakes he makes in entering the employee's identification number by using a BKSP key 148, and, after completely typing the identification number, the supervisor depresses an ENTER button 150 to signal to the computer 104 which employee is clocking in or out.

Requiring the employees to clock in and clock out on the time clocks 101 after a supervisor has opened the time clock 101 has several advantages. Since the time clock 101 is linked to the computer 104 (FIG. 1), the clock in and out times for each individual employee can be directly transmitted to an appropriate file for accounting and payroll purposes without requiring any paper work or additional input of time by a third person. Additionally, since the supervisor must open the time clock 101, he can instantaneously verify the time at which each of the employees clocked in and clocked out, thereby minimizing the need for subsequent review of clock in and clock out records for employees. Also, since the time clocks 101 are preferably located in the workplace adjacent to the work stations of the employees, the amount of transit time for the employees to move from the time clock to their work stations is minimized. Further, requiring the supervisor to be presented at the beginning and end of shifts of employees promotes better communication between the supervisors and the employees.

If an employee will be working in a different job capacity than usual, and there is a need to record the hours that he worked in this different job capacity, either for accounting purposes, e.g., the employee will be working for a different project or department, or for pay purposes, e.g., the employee will be working for greater pay, then the supervisor, subsequent to the employee depressing the IN button 140, depresses a JOB CHANGE button 152. The effect of depressing the JOB CHANGE button 152 depends in this preferred embodiment upon whether the clock is allocated or non-allocated.

All the employee hours logged on an allocated clock are recorded and stored in the computer 104, and the employee's time is charged to the department or division of the company assigned to that particular time clock 101. On these allocated time clocks 101, once the supervisor has depressed the JOB CHANGE button 152, the LCD display 126 then prompts the supervisor to enter a job code corresponding to the job the employee will be performing by using the numerical buttons 146. The employee then scans his ID badge through the slot scanner 130 (FIG. 2). Hence, when the employee is working at a job outside of his original department, the accounts of the division or department to which this time clock 101 is assigned is debited the pay amount for this employee's hours.

At non-allocated time clocks 101 however, all hours logged by a specific employee are charged to the employee's registered division, department, and job even if the employee is working in another division or department or job. For these time clocks 101, the supervisor has to manually fill out a timekeeping form and submit it to the timekeeping department 108 who then enters any changes in accounting or pay via the timekeeping personal computers 109 (see FIG. 1).

When an hourly employee is working for a specific special event, or project, such as a promotional sale requiring extended hours of operation, for which the employer desires a specific accounting record, the employee's time can be recorded in the memory of the computer 104 (FIG. 1) as attributed to the special event. This is accomplished by the supervisor depressing a SPECIAL EVENT button 154 and typing an identification number for the special event after opening the clock 101 and the employee depressing the IN button 140 or the OUT button 142.

The JOB CHANGE button 152 and the SPECIAL EVENT button 154 permit the supervisor to reassign employees to different divisions, departments and jobs or to a specified special event while minimizing the amount of additional paper work that the supervisor must fill out. Further, the accounting record for the employee, working either in a different department, division or job, or for a special event is automatically generated and recorded on the computer 104 at the time the employee is actually logging in or out. This minimizes the need for the timekeeping department 108 to independently generate accounting records for the change in job or work on special events.

The control panel 124 also contains a YES button 156 and a NO button 160 which are used by the supervisor to respond to questions displayed on the LCD display 126. These buttons permit the supervisor to approve exceptions relating to a particular employee's work at the time the employee is logging in or out without requiring any additional paper work or attention by the supervisor. Further, the control panel 124 also contains a CANCEL button 158 which is used to cancel a clock in or clock out sequence in the middle of the sequence. Finally, the keypad 124, also contains three button 162, 164, 166 which, in this presently preferred embodiment, do not have any function. However, these buttons are connected to the microprocessor of the time clock 101 and are reserved for additional functions.

Figure 3A:
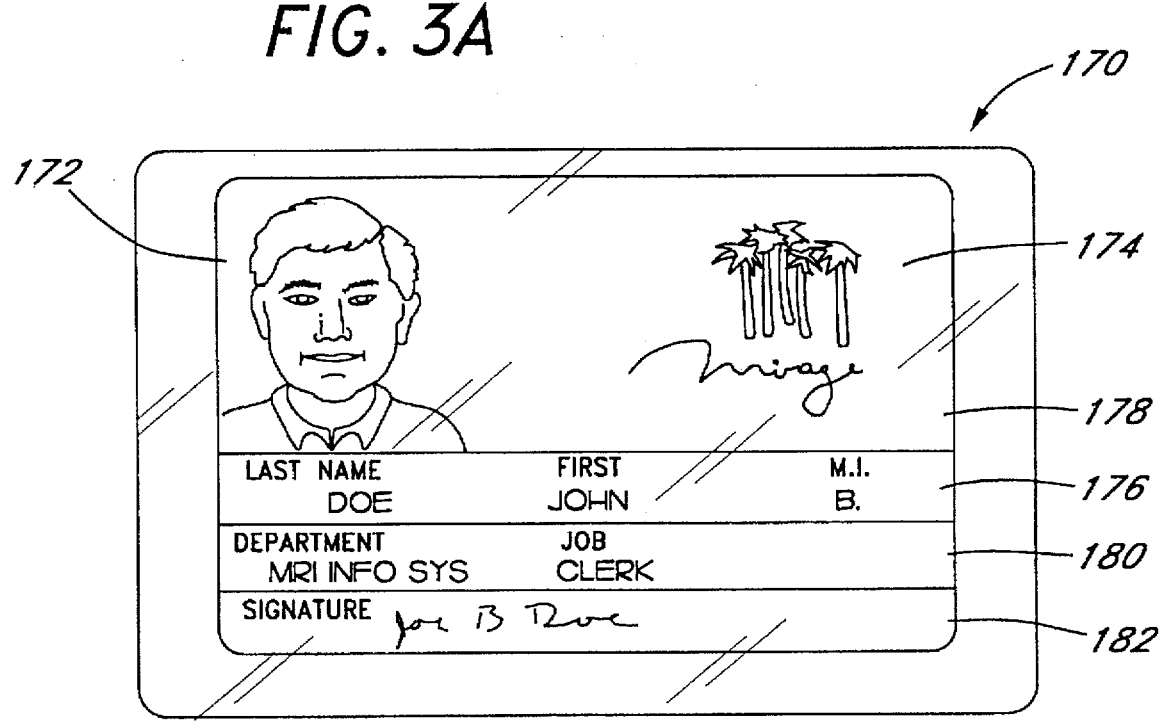
FIG. 3a is a front view of a typical identification badge configured to be used with the time clock shown in FIG. 2.

FIG. 3a shows the front side of an identification badge or card 170 which is typical of the ID badges assigned to each of the employees, including the supervisors, in the workplace. The ID badge 170 are preferably plastic laminated card type badges similar in size and construction to well known identification cards or badges, e.g., driver's licenses. The front side of the ID badge 170 preferably contains a photograph 172 of the employee to which the badge 170 is assigned. Further, the ID badge 170 preferably contains a header 174 identifying the employer or company and possibly including a logo, a line 176 containing the name of the employee, a line 178 containing an ID number assigned to this employee, a line 180 containing the job classification of this employee, as well as other pertinent information about the employee, such as other jobs the employee is qualified to perform and length of employment with the company. Finally, the ID card or badge 170 also contains a signature line 182. The photograph 172 and the information contained on the lines 176–182 are used by the supervisor to verify that the person who is either clocking in or out of work at the time clock 101 is the actual employee designated to work at that time. This verification by the supervisor prevents other employees from clocking in and out for one particular employee who was not actually at the workplace.

Figure 3B:
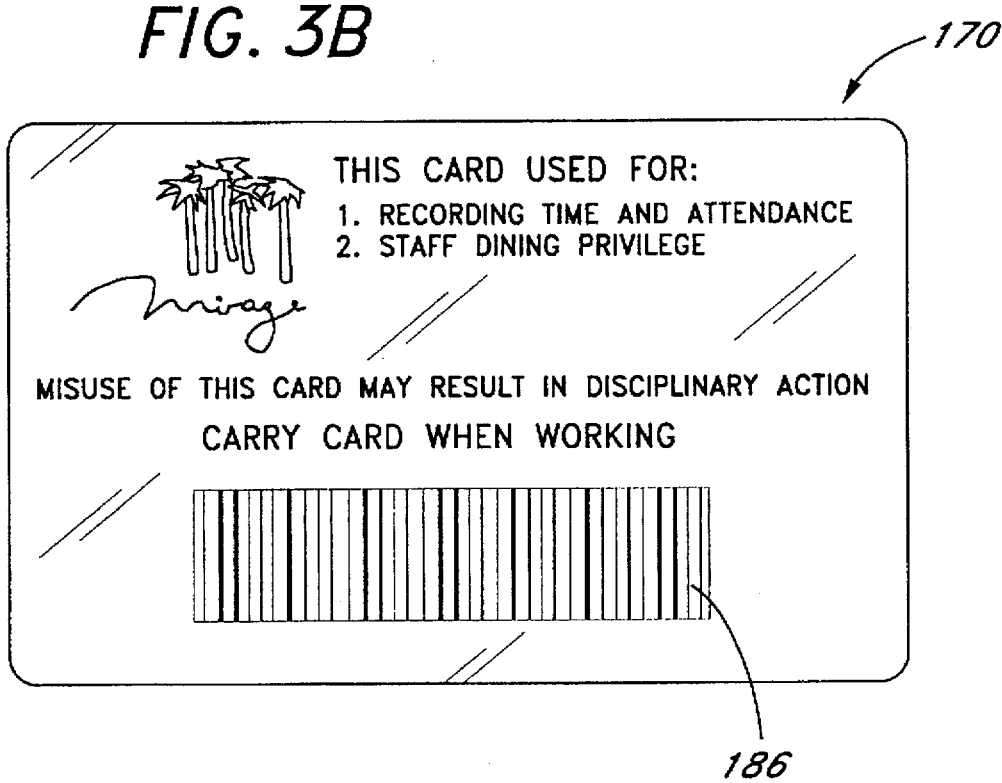

FIG. 3b shows the back side of the ID badge 170. The back side contains written instructions as well as a bar code 186 which is individualized for each of the employees. The bar code 186 is read by the slot scanner 130 of the time clock 101 (FIG. 2) and is at least 0.2 inches tall and positioned parallel to the edge of the scanned card that is swiped through the slot scanner 130. Preferably, the bar code 186 is masked by an opaque covering (not shown), which prevents people from seeing the bar code 186 and duplicating it for other purposes. The opaque covering is, however, made of any well-known material that permits the slot scanner 130 to scan the bar code 186 using infra-red light. When the bar code 186 is scanned by the slot scanner 130, the time clock 101 receives a signal indicative of the ID number corresponding to the employee whose ID card 170 has just been scanned. The time clock 101 then transmits this information to the computer 104 which stores in memory the clock in or out time for this employee.

II. TIME AND ATTENDANCE DATA ACCESS AND STORAGE

Figure 4:
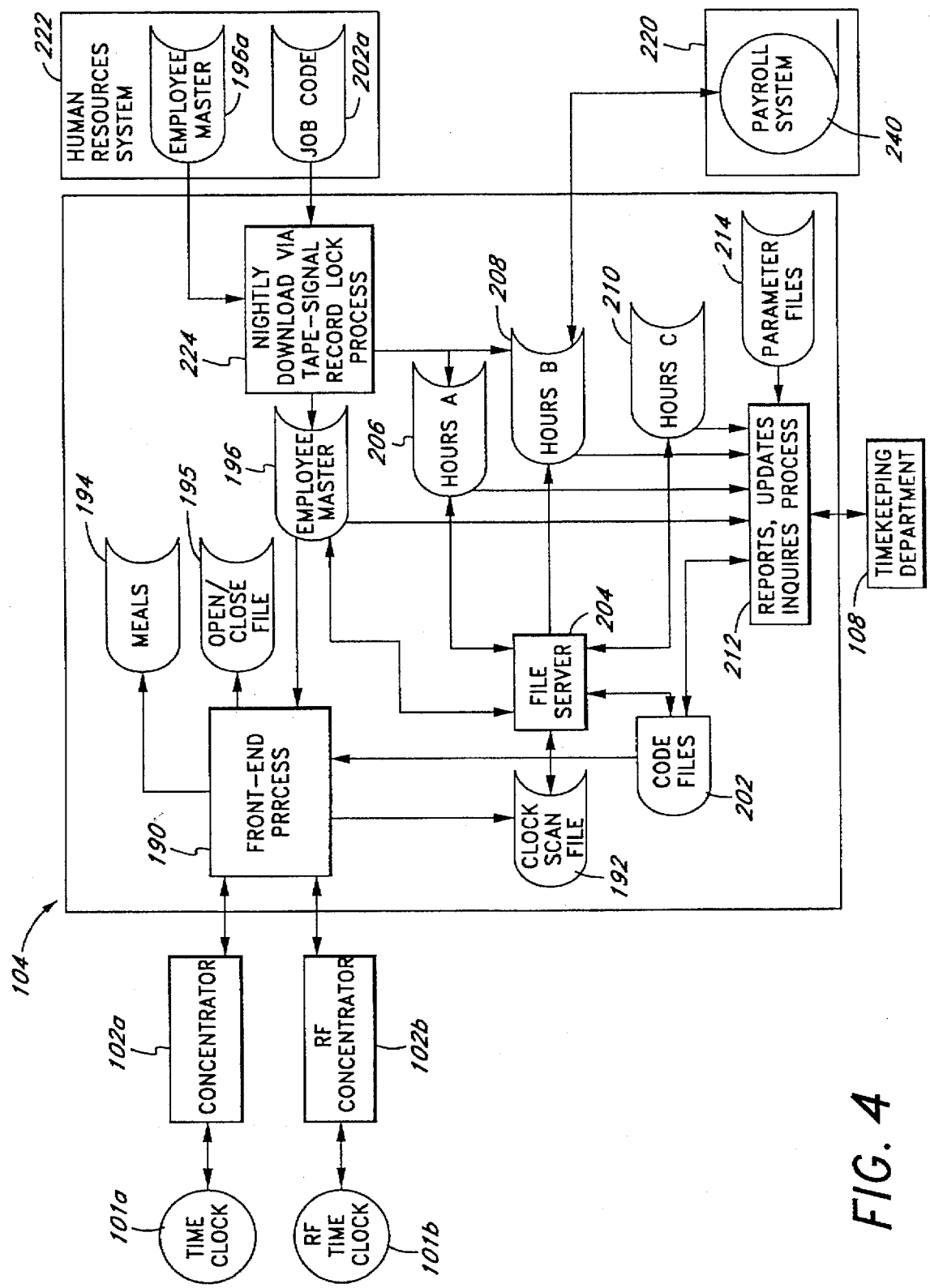
FIG. 4 is a functional block diagram of the time and attendance system of FIG. 1 illustrating information flow in the time and attendance system of FIG. 1 as well as information storage and organization within the time and attendance system of FIG. 1.

FIG. 4 is a diagram illustrating the information flow between the time clocks 101 and the computer 104, the file structure inside the computer 104, and the information flow from the computer 104 during downloading procedures as further described below. The time clocks 101 and the concentrators 102 are interactively connected to the computer 104 via a front end process 190. The front end process 190 is a computer software process executed by the computer 104 which performs two basic functions. First, the process 190 organizes and stores information received from the time clocks 101, and second the process 190 retrieves information from the memory files of the computer 104 and sends this information to the appropriate time clock 101. As a secondary function, the front end process 190 verifies correct transmission of data to and from the concentrators 102 using well known techniques.

Software for the front end process 190 is preferably implemented on a Tandem COBOL 85 T9257C30 compiler. The source code for the software describe herein implementing the front end process 190 in this preferred embodiment was written in COBOL 85 and is enclosed in the Microfiche appendix attached herewith entitled $DEV3.TADEVSRC.TASRV10. One skilled in the technology will recognize that the steps in the accompanying figures and flow diagrams (FIGS. 4–21), wherein operations of the front end process 190 are implicated, can be implemented by using a number of different compilers and/or programming languages.

It should also be observed that the following figures and flow diagrams (FIGS. 4–21) are only means to represent the functional equivalents of their source code counterparts, and so, the diagrams may include material that does not completely parallel the named location of the function.

Typically, the front end process 190 receives clock scan information, i.e., the log in and log out times for particular employees, from the time clocks 101. This information is then stored as a clock scan data structure 192 which may include one or more files. The clock scan data structure 192 preferably contains a file for each of the hourly employees assigned an ID number. The information contained in each of the files of the clock scan data structure 192 for each employee is summarized in Table 1 below.

TABLE 1

CLOCK SCAN FILE

| Clock Date | Job Code |
| Clock Time | Special Event Code |
| Employee Number | Hours Worked |
| Clock time (In, Out, Meal) | Hours Types |
| Clock ID | Hours Keyed by Supervisor |
| Supervisor Number | No Badge Flag |
| Division | Exceptions and Approval |
| Department | |

Referring to Table 1, the information generally includes the date and time, according to the time clock 101, that the employee either logged in or out on the current date, the identification number of the employee, information identifying the time clock 101 where the transaction took place, information identifying the hours worked and the type of hours, and information about whether the hours worked were for a special event. Further, files in the clock scan data structure 192 also contains information about each particular transaction, e.g., the supervisor who logged the employee in, and whether the supervisor used the NO BADGE button 144 (FIG. 2a). The information shown in Table 1 is preferably stored in a manner that is readily accessible to the computer 104. One method of organizing file data used in this preferred embodiment for the files of the clock scan data structure 192, as well as the files in other data structures described below, is the Index Sequential Access Method (ISAM). ISAM is a well known method of organizing file data, enabling the computer 104 to quickly locate information relating to each of the employees within the system.

The front end process 190 also receives meal scan information from the dedicated meals time clocks 101. Such clocks 101 (which may be wired or wireless) are positioned within the employee cafeterias located in the workplace. These time clocks 101, in this preferred embodiment, are configured to signal to the front end process 190 each time an employee scan his ID card indicating that he has taken a meal. This information is then recorded by the front end process 190 in a file within a meals data structure 194 corresponding to this particular employee. The operation of the time clocks 101 located within the cafeteria is discussed in greater detail in reference to FIG. 21 below. The information stored in each file of the meals data structure 194 for each employee is summarized in Table 2 below.

TABLE 2

MEALS FILE

| Company | Department |
| Date | Job Code |
| Employee | Meal Count |
| Division | |

Referring to Table 2, an employee's file in the meals data structure 194 contains information about the employee including ID number, assigned company, department, division and job, as well as the number of meals he has consumed in the cafeteria on a given day. This information permits an accounting record to be made of the amount of meals consumed, which can be used for planning purposes. As can be appreciated, the information sent from the time clock 101 located within the cafeteria can be readily expanded in alternative embodiments. For example, a cashier could also be located adjacent to the time clock 101 who would then total the value of the meal taken by the employee and enter this information into the time clock 101. This information could then be used to either generate a more accurate accounting record, or even be deducted from the employee's paycheck depending upon the work rules for this particular employee.

The front end process 190 also stores information in an Open/Close file 195. The Open/Close file 195 maintains a record of the number of times each time clock 101 was closed automatically and also records the name of the supervisor who did not close the time clock 101 by scanning his identification badge 170. The Open/Close file 195 is discussed in greater detail in reference to FIG. 8 below.

The front end process 190 also retrieves information stored in the memory of the computer 104 which is then used by the time clock 101 when employees are clocking into and out of work. The operation of the time clock 101 during this type of clock processing is described in greater detail in reference to FIGS. 9–20 below. The front end process 190 typically retrieves this information from an employee master data structure 196. The employee master data structure 196 includes a file containing information about each particular employee. The information contained within a file in the employee master data structure 196 for a particular employee is summarized in Table 3 below.

TABLE 3

EMPLOYEE MASTER FILE

| | |
|---|---|
| Company | Standard Shift |
| Employee Number | Start Day of Work Week |
| Check Digit | Clock Zones |
| Name | Pay Type |
| Division | Status |
| Department | Meals Allowed |
| Job Code | Summary of Earnings Data |
| Base Rate | Misc Demographic Data |
| Pay Rules | |

Referring to Table 3, an employee's file in the employee master data structure 196 contains information about the employee, including his name, his ID number, his employment status, e.g., whether he has been terminated, or on leave and the pay rates, pay rules and type for this particular employee as well as the standard work shift. Further, the employee's file also contains information about this particular employee's job, including the division, department, clock zone, and job code as well as a summary of earnings the employee has made to date within the current pay period. In the employee master data structure 196, there are also employee master files for each of the supervisors. The supervisor employee master files (not shown) contain similar information as shown in Table 3 above, and it additionally contains information about which time clock zones the supervisor is authorized to open the time clock and approve exceptions.

The front end process 190 also retrieves information, in response to signals originated by the time clocks 101 during clock processing, from both a code files structure 200 which include a message/special event code data structure (not shown) and a job code data structure (not shown). The message/special event code data structure contains files for each of the special events for which a separate accounting record is being maintained. These files contain information about each special event as well as messages that should be passed along when a supervisor assigns an employee to a special event. The information within a file of the special event data structure is summarized in Table 4 below.

TABLE 4

CLOCK MESSAGES & SPECIAL EVENTS

| | |
|---|---|
| Company | Date Range |
| Division | Message/Name |
| Department | Event Code |

The job code data structure contains a file for each of the various jobs that employees can perform at the workplace. This information in this file includes the job code, the company, division and department in which it is performed, and rules governing worker performance and benefits for the particular job. The contents of a typical job code file, included in the code files 202, is summarized in Table 5 below.

TABLE 5

JOB CODE FILE

| | |
|---|---|
| Company | Portal Time in Minutes |
| Division | Max Meals per Day |
| Department | Max Hours to Search Back to a Clock In |
| Job Code | Union Code |
| Round Up Minutes | Rule ID |
| Round Down Minutes | Report Selections |
| Shift Start Times | |

The front end process 190 also has access to other files during clock processing not shown in FIG. 4, which are discussed in reference to FIGS. 9–21 below.

Information from the time clocks 101 that is stored by the front end process 190 in the clock scan data structure 192 is then periodically organized, e.g., daily, by a file server 204 and stored in either an Hours A data structure 206, an Hours B data structure 208, or an Hours C data structure 210. The Hours A, Hours B and Hours C data structures 206, 208, and 210 each contain accumulated information pertaining to the hours worked by each employee. The specific contents of these data structures is described in greater detail below. Each of the data structures 206, 208, and 210 are preferably ISAM organized, and each contain a file for each of the employees working in the workplace. The file server 204 updates the Hours data structures 206, 208, and 210 preferably on a continuous basis using the information contained within the clock scan data structure 192, the employee master data structure 196, the codes data structure 202, and the meals data structure 194. Source code implemented by the file server 204 performing the function of updating these files, as well as other functions, is included in the Microfiche Appendix and is entitled $SYSTEM.TAGND-SRC.TASRV000.

The Hours A data structure 206 contains a separate file for each of the hourly employees in the workplace. The information stored in a single employee's file in the Hours A data structure 206 is summarized in Table 6 below.

TABLE 6

HOURS A FILE

| | |
|---|---|
| Company | Department |
| Worked Date | Job Code |
| Employee Number | Base Rate |
| Name | Pay Rules |
| Division | |

Referring to Table 6, the file for a particular employee in the Hours A data structure 206 contains information including the employee's name, employee ID number, the job code of the employee's job code, the pay rate and rules for this employee, and the department, division and company to which the employee is assigned. Further, the file also contains the date on which the employee last worked.

The Hours B data structure 208 also contains a separate file or data record for each of the hourly employees in the workplace. The information stored in a single employee's file on data record in the Hours B data structure 208 is summarized in Table 7 below.

TABLE 7

HOURS B FILE

| | |
|---|---|
| Company | Worked Pay Rate |
| Worked Date | Hours Worked |
| Employee number | Type of Pay |
| Worked Division | Exception Codes |
| Worked Department | Approval Codes |
| Worked Job Code | Adjustment Code |

Referring to Table 7, the Hours B data structure 208 for a single employee contains the company name, the employee ID number, the dates, divisions, departments, hours, and pay rates for the hours the employee has worked during the preceding pay period. Further, the Hours B data structure also contains the various approval, exception and adjustment codes that apply to this particular employee. The information for each employee contained within the Hours B data structure 208 is downloaded to a payroll system 220 on a regular basis, e.g., at the end of every pay period. The downloading of the contents of Data structure B 208 to the payroll system 220 is described in reference to FIG. 8 below.

An Hours B data record for an employee is generated every time the employee works a shift, i.e., clocks into and subsequently out of work. Hence, on any given day, the Hours C data structure 210 also contains a separate file or data record for each of the hourly employees in the workplace. The information contained within a single employee's file in the Hours C data structure 210 is summarized in Table 8 below.

TABLE 8

HOURS C FILE

| | |
|---|---|
| Company | Clock In Supervisor |
| Worked Date | Clock Out Time |
| Employee | Clock Out Supervisor |
| Clock In Time | No Badge Flag |

Referring to Table 8, the Hours C data structure contains information about the shifts worked by the employee or the last day worked by the employee. This information includes the date upon which the employee last worked, when he clocked in and out, and who the supervisors were, and whether the employee clocked in or out without his ID badge 170 (FIGS. 3a and 3b). Since an employee may have worked more than one shift on the last day worked, multiple data records containing the information summarized in Table 8 may be created for a single employee.

The information contained within the Hours A data structure 206, the Hours B data structure 208, and the Hours C data structure 210 is used to generate accounting and payroll records. Further, the timekeeping department 108, using the timekeeping computers 109 (FIG. 1), can access the information in the Hours data structures 206, 208, 210, as well as the employee master data structure 196 and the code files 202 via an interface process 212 to generate reports, answer inquiries, or update these files.

When the timekeeping department 108 is generating a report, the interface process 212 accesses a parameter data structure 214 permitting the operator in the timekeeping department 108 to select the parameters of the report that he intends to generate. Generation of reports is described in greater detail in reference to FIG. 9 below.

Also shown in FIG. 4 is an external human resources system 222. The human resources system 222 is a computer system which is also used to create and update files within an employee master data structure 196 and files within a codes data structure 202. Newly created or updated files are then downloaded into an interface or process 224 which uses the information contained in the data structures 196, 202 to update the employee master data structure 196 and the code data structure 202. Hence, in this preferred embodiment, the employee master data structure 196 and the code data structure 202 in the computer 104 can be updated either by the timekeeping department 108 via the personal computers 109 and the interface 212, or by the human resources department downloading files from the human resources system 222 to the interface 224 within the computer 104.

Figure 5:
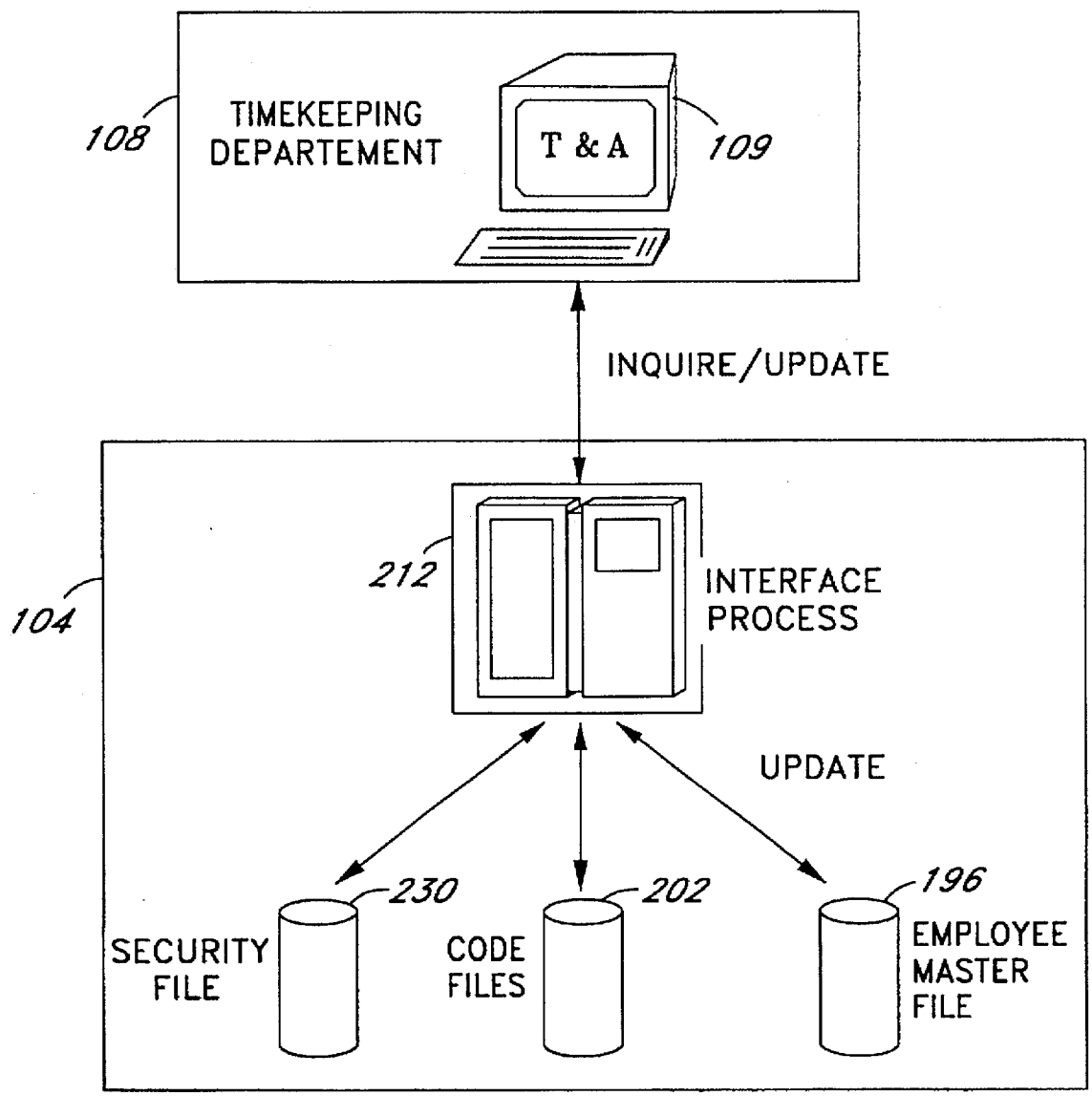
FIG. 5 is an operational flow diagram illustrating file creation and maintenance in the time and attendance system of FIG. 1.

FIG. 5 is an operational flow diagram illustrating the basic operation of the time and attendance system 100 when files in the code files structures 202, and the employee master data structure 196 are created and maintained by the timekeeping department 108. An authorized person within the timekeeping department 108, using the timekeeping computers 109, sets up and maintains these files and thereby performs tasks such as creating files for new employees in the employee master data structure 196 or creating new code files for new jobs, etc., in the codes data structure 202. A security data structure 230 contains security files for each authorized employee. The security data structure 230 is used by the computer 104 to deny access to employee master files 196 or to the code files 202 to unauthorized individuals. The contents of a typical file stored in the security data structure 230 is summarized in Table 9 below.

TABLE 9

SECURITY FILE

| | |
|---|---|
| Company | Screen ID |
| User ID | Access Codes |
| User Initials | |

Figure 6:
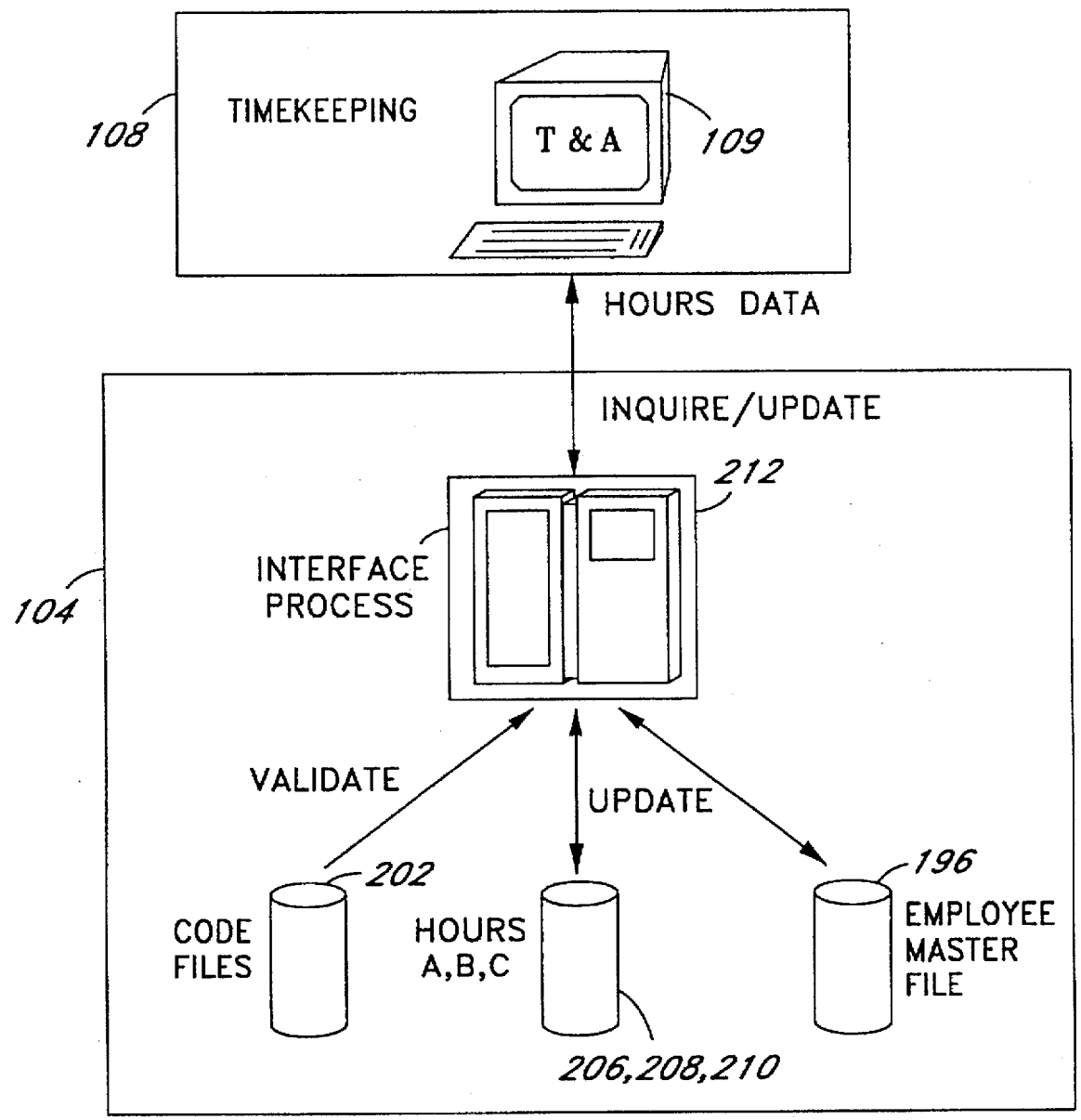
FIG. 6 is an operational flow diagram illustrating one method of updating the memory files in the computer of the time and attendance system of FIG. 1.

FIG. 6 is an operational flow diagram illustrating how the timekeeping department 108 updates information contained within the hours A data structure 206, the hours B data structure 208, and the hours C data structure 210 as well as the employee master data structure 196 using the personal computers 109. Access to these files is preferably limited to authorized personnel and the security file 230 (see, FIG. 5 and Table 9 is used to verify that only authorized personnel have access to these files. The timekeeping department 108 can access an employee's file in the employee master data structure 196 and change such things as, for example, his job title, pay rate and pay rules to reflect a promotion. As another example, if on one shift an employee clocks in to the time clock 101 at the beginning of his shift, but then fails to clock out at the end of his shift, the information in the hours B data structure 208 for this employee will not correctly reflect the number of hours that the employee has worked. Hence, the timekeeping department 108 can step in and update the hours data corresponding to this employee and correct the failure of the employee to log out using the timekeeping computers 109.

Changes to either the employee master data structure 196 or the hours data structures 206, 208, 210 typically involve the timekeeping department entering the job code or various other codes to identify the change to be made. These codes are stored within the codes data structure 202 which is used to ensure that the codes entered by the timekeeping system 108 are valid codes.

The employee master data structure 196 for each employee is set up when the employee is first hired and it is subsequently updated when the employment status of the employee changes. Changes in status can include a change in job description, a change in the department or division that the employee works for, a change in the hourly rate that the employee is being paid or the rules by which the employee is paid. As mentioned previously, updates to these files can also be made by downloading information from the external human resources system 222 via the interface 224 (FIG. 4).

Figure 7:
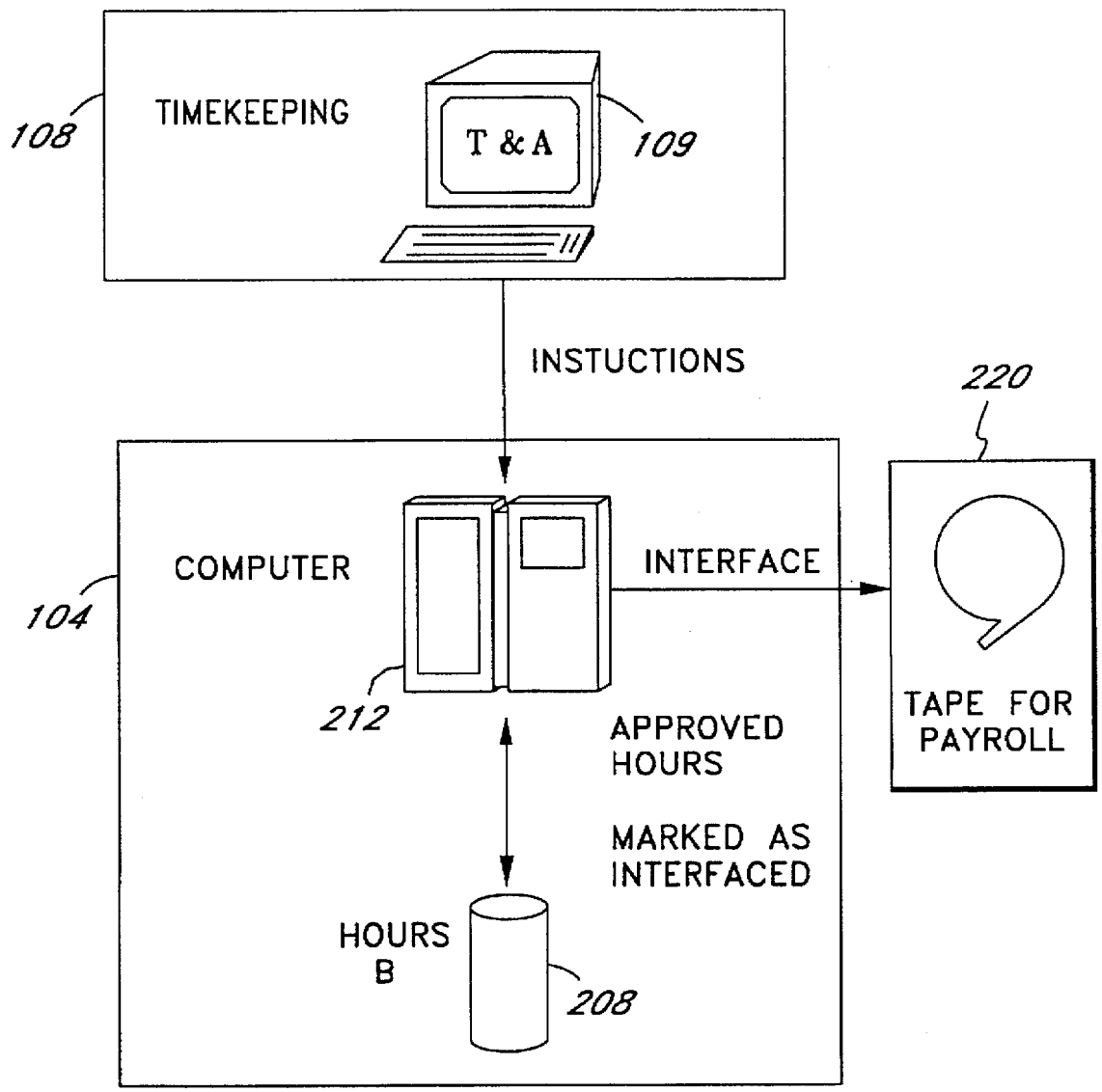
FIG. 7 is an operational flow diagram illustrating the interface between the time and attendance system of FIG. 1 and an external pay roll system.

FIG. 7 is an operational flow diagram illustrating the interface between the time and attendance system 100 and the payroll system 220 (FIG. 4) when payroll data is downloaded from the hours B data structure 208 in response to commands from the timekeeping department 108 executed on the computers 109 and received by the interface 212. In this presently preferred embodiment, when downloading the data in the Hours B data structure 208, the time and attendance system 100 generates a computer tape 240 containing information about the number of hours worked by each employee, including hours which have been recorded as overtime hours, and pay rate. In this preferred embodiment, the computer tape 240 is then loaded into a payroll computer (not shown) which generates the payroll checks. Once the Hours B data structure 208 has been downloaded, the individual downloaded files are marked by the computer 104 as interfaced indicating that the employees have been paid for these hours. Of course, the time and attendance system 100 shown in FIG. 4 can be modified in an alternative embodiment so that the computer 104 will use the information contained in the Hours B data structure 208 to generate the payroll checks as opposed to an external payroll system.

Figure 8:
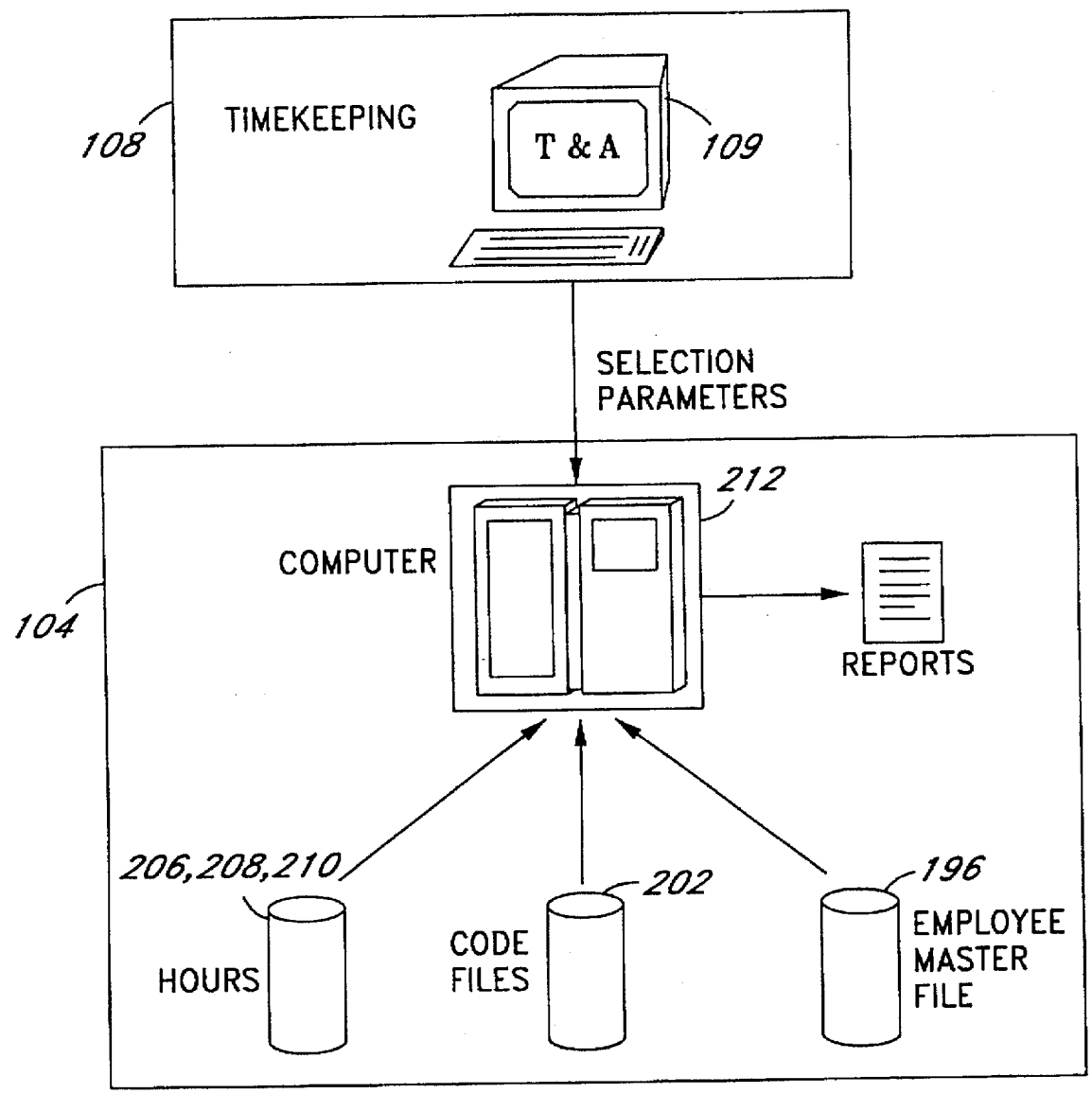
FIG. 8 is an operational flow diagram illustrating the generation of reports by the time and attendance system of FIG. 1.

FIG. 8 is an operational flow diagram illustrating how the time and attendance system 100 generates printed reports for use by department managers and supervisors. These reports can be used, for example, to follow up and finalize an exception approved by a supervisor at a time clock 101, resolve disputes between a supervisor and an employee regarding hours or paycheck amounts, or to adjust an employee's hours. The reports are generated in response to the timekeeping department selecting parameters stored within the parameter files 214 (FIG. 4) via the personal computers 109 and the interface 212. The selected parameters are then used to search for the desired information in the Hours data structures 206, 208, 210, the code files 202 and the employee master file 196 as well as other files (not shown), necessary to generate the selected report.

One such report is a Clock Open/Close Report which lists all open and close activity at a designated time clock 101 including whether the time clock 101 (FIG. 4) was closed by a supervisor or closed automatically. In this preferred embodiment, the time clock 101 is programmed to automatically close, i.e., not accept any more data, after two minutes of no activity on the time clock 101. The Clock Open/Close report can be used to review either all activity on a selected time clock 101, or simply when the time clock 101 is automatically closed within a range of specific dates. Further, the report can be specific to either a particular supervisor, based on his identification number as encoded on his ID badge 170 or for an entire department which uses a particular time clock 101. The information used to generate this report is stored in a Supervisor Open/Close file 195 in the memory of the computer 104. This file is updated each time a time clock 101 is activated. The information contained within this file for each time clock 101 is summarized in Table 10 shown below.

TABLE 10

| SUPERVISOR OPEN/CLOSE FILE | |
|---|---|
| Date | Open/Close Time |
| Division | Supervisor Number |
| Department | Record Type |
| | (Open, Close, Autoclose) |
| Clock ID | |

Referring to Table 10, the Supervisor Open/Close File 195 keeps a daily record of when each time clock 101 is open and closed, which supervisor opened and closed the time clock 101, and whether the time clock 101 was automatically closed or was closed by the supervisor. The information stored within the file 195 is accessible to the timekeeping department 108 via the computers 109 and the interface 212.

A report can also be generated by the computer 104 in response to appropriate parameters selected by the timekeeping department 108 from the parameters file 214 (FIG. 4) showing all of the employees who have used the NO BADGE button 144 (FIG. 2a) to either log in or log out during a set period of time, and the supervisors who have approved the log in or log out with the NO BADGE button 144. The information needed to generate this report is stored in the Hours C data structure 210 (see FIG. 4 and Table 8). This report can then be used to identify particular employees who are habitually forgetting their ID badges 170 as well as supervisors who are not sufficiently diligent in requiring employees to have their ID badges 170. As can be appreciated, the efficiency of logging persons into and out of the time and attendance system 100 is maximized when the employees log in and log out by using their ID badges 170.

A report listing employees who have clocked-in or clocked-out outside of their normal time clock zone, as well as the supervisors who approved the zone exceptions can also be generated by the computer 104 in response to appropriate parameters selected by the timekeeping department from the parameters file 214 (FIG. 4). These reports can be generated for a selected date range, a selected Division, Department, or job, and for a specific time clock 101 and these reports can be used to determine employee and supervisor adherence to assigned zones and work areas. The employee's assigned work station is stored within the employee master file 196 (FIG. 4, Table 3), the locations where the employee worked is stored in the Hours B data structure 208 (FIG. 4, Table 7) and the supervisor who logged the employee into a specific work area is stored in the Hours C data structure 210 (FIG. 4, Table 8).

Other reports, specific to particular employees or groups of employees, can also be generated by the computer 104 based on the parameters entered into the personal computers 109 by the timekeeping department 108. Specifically, reports showing the hours an employee worked on a given day, including the overtime hours, can be generated by accessing the information stored in the hours B data structure 208 (FIG. 4). Additionally, the computer 104 can also generate a report which prints out a copy of the information contained within the employee master data structure 196 (FIG. 4) for a particular employee.

These aforementioned reports are generated by the computer 104 in response to the appropriate inputs from the time-keeping department 108 via the computer 109 (FIG. 1). Computer source code implemented on the computer 104 which generates these reports is included in the Microfiche Appendix attached herewith.

III. TIME CLOCK OPERATION

Generally referring to FIG. 4, the time clocks 101 of the presently preferred embodiment includes a microprocessor and two 32 k×8 bit Random Access Memories (RAMs) and are user programmable. These time clocks 101 are programmed to transmit information, such as the clock in and clock out times of the various employees and number of the supervisor opening and closing the time clock 101, to the computer 104 for storage in memory. Further, these time clocks 101 are also programmed to receive signals from the computer 104 requiring either the supervisor or the employee respond appropriately to specific questions via the time clock 101. The microprocessor of the time clock 101 is programmed in Interactive Reader Language, a language developed by Intermec and commercially available for its Model 9560 time clock. The programming for this preferred embodiment is described in greater detail below with reference to FIGS. 9 through 21.

Figure 9:
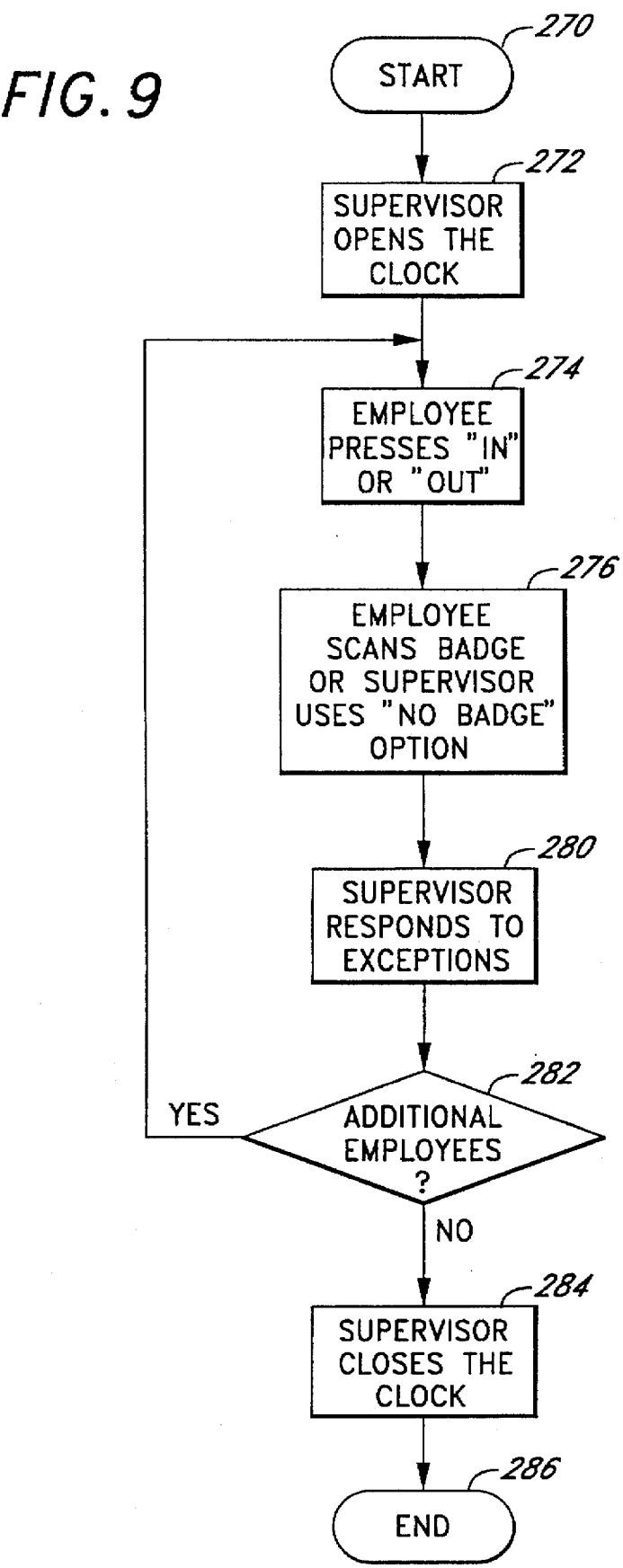
FIG. 9 is a top level flow diagram illustrating the basic operation of a time clock of the time and attendance system shown in FIG. 1 when employees are clocking into and out of work.

FIG. 9 is a top level flow diagram illustrating the operation of a time clock 101 as it interactively interfaces with the supervisor and employees while the employees are clocking into and out of work. From a start state 270, the time clock 101 proceeds to state 272 wherein the supervisor opens the time clock 101 by scanning his ID card 170 through the slot scanner 130 (FIG. 3). The time clock 101 then sends a signal to the front end process 190 (FIG. 4) in the computer 104 that the time clock 101 has been opened by this supervisor.

Once the time clock 101 is opened, the supervisor or an employee depresses either the IN button 140 or the OUT button 142 (FIG. 2a) in state 272 to indicate whether they are clocking into work at the beginning of their shift or clocking out of work at the end of their shift. Once the IN button 140 or the OUT button 142 has been depressed in state 272, the employee then scans his ID badge 170 (FIGS. 3a and 3b) in state 276 or, if the employee does not have his ID badge 170, the supervisor manually enters the employee's number after depressing the NO BADGE button 144 (FIG. 2a). The time clock 101 then sends an appropriate signal to the front end process 190 identifying the employee and the time he scanned his card. The front end process 190 (FIG. 4) then stores this information in the employee's file in the Clock Scan data structure 192 (FIG. 4).

After the employee has either clocked in or out in states 274 and 276, the supervisor then responds to exceptions pertaining to this employee in state 280. In state 280, the supervisor can assign the employee to work in a job other than the employee's normally assigned job, or work for a specific special event. In either case, the time clock 101 sends an appropriate signal to the front end process 190 resulting in the changed job assignment or assignment to a special event to be stored in an appropriate memory file.

Further, in state 280, the computer 104 may determine that a specific exception applies to the employee, e.g., the employee is entitled to overtime for this shift requiring supervisor approval. In this case, the front end process 190 sends a signal to the time clock 101 causing it to display a message on the LCD display 126 (FIG. 2) requiring the supervisor or the employee to respond to the message using the buttons mounted on the face of the time clock 101. The response is then sent back to the computer 104 and stored in an appropriate memory file.

From state 280, the time clock 101 moves to decision state 282 where the supervisor determines whether there are additional employee's waiting to clock in or out of the time clock 101. If there are additional employees, the supervisor or next employee depresses the IN button 140 or the OUT button 142 (FIG. 2a) in state 274. The time clock 101 then proceeds to loop through states 274, 276, 280 as previously described until there are no more employees to clock in or out in decision state 282.

When there are no more employees to clock in or out, the supervisor closes the time clock 101, in state 284, by scanning his ID card 170 (FIGS. 3a and 3b) in the slot scanner 130 (FIG. 2). As described previously, in this embodiment the time clock 101 is also programmed to automatically close if there has been more than two minutes in which there has been no activity on the time clock 101.

The supervisor is thus required to be present at the time clock 101 when the employees are clocking in and out permitting the supervisor to contemporaneously verify the clock in and clock out times of each of the employees. Further, the supervisor can also make new job assignments and approve exceptions, and have these new job assignments and exceptions automatically recorded in the memory of the computer 104 at the time when the assignment or exception is made. After the supervisor closes the time clock 101 in state 204, the time clock 101 proceeds to a return state 226. The operation of the time clock 101 illustrated in FIG. 9 will now be described in greater detail with reference to FIGS. 10–20 below.

Figure 10:
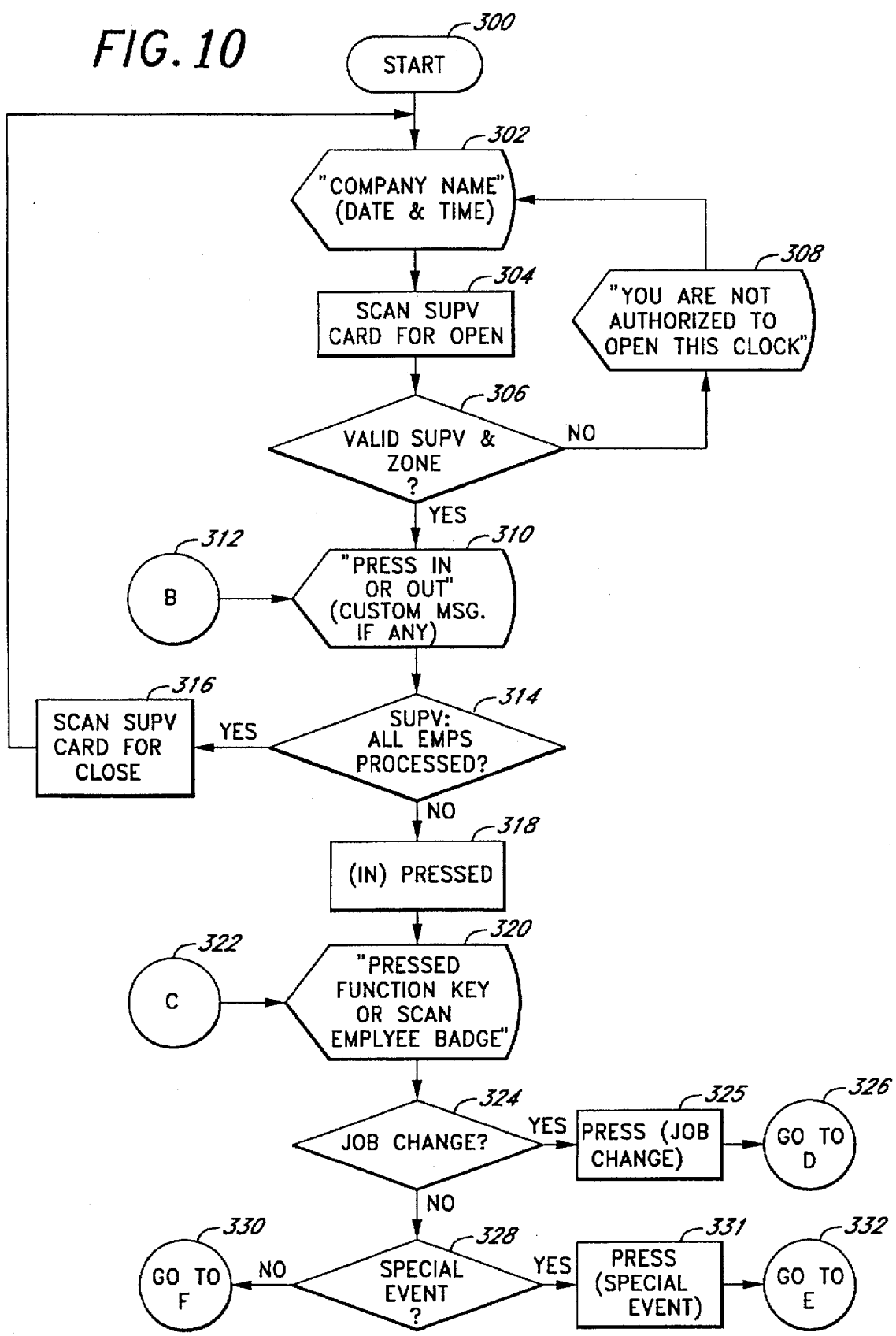
FIG. 10 is a flow diagram of a function performed by a time clock of the time and attendance system shown in FIG. 1 when an employee is clocking in while the time clock is performing the basic operation shown in FIG. 9.

FIG. 10 is a flow diagram illustrating the time clock 101 performing the function of clocking in an employee. From a start state 270, called by the time clock from state 274 (FIG. 9), the time clock 101 displays, in state 302, the company name, e.g., The "Company Name", and the current date and time on the LCD display 126 (FIG. 2). The time clock 101 (FIG. 1) then proceeds, in state 304, to scan for a supervisor's ID card 170 (FIGS. 3a and 3b) opening the time clock 101.

Once an individual has scanned or swiped his card 170 in state 304, the time clock 101 verifies, in decision state 306, whether the ID card is valid and authorized to open this particular time clock 101. This verification is made by the time clock 101 communicating to the front end process 190 of the computer 104 (FIG. 4) a code identifying the time clock 101, the identification number encoded in the bar code 186 of the individual's ID badge 170 (FIG. 3b) and a requesting the front end process 190 to verify whether this individual is authorized to open this particular time clock 101. Upon receipt of this communication, the front end process 190 verifies whether the individual is a supervisor authorized to open this particular time clock 101 by reviewing the file employee master data structure 196 (FIG. 4) for this particular supervisor. If the individual is not authorized to open the time clock 101, then the front end process 190 so signals the time clock 101 causing it to display the message "YOU ARE NOT AUTHORIZED TO OPEN THIS CLOCK" on the LCD display 126 (FIG. 2) in state 308. From state 308, the time clock 101 returns to state 306 where company name, date, and time are redisplayed. If the ID card 170 is found to be valid for opening the time clock 101 in decision state 306, the time clock 101 is then opened for employee processing permitting employees to clock in and out of work. Note, if at any time after a time clock 101 has been opened for processing, the CANCEL button 158 (FIG. 2a) is pressed, the time clock 101 returns to state 310.

After the time clock 101 is opened for processing, the microprocessor (not shown) contained within time clock 101 initiates the previously described function where it detects whether there has been no activity on the time clock 101 for more than two minutes necessitating an automatic closing of the time clock 101. This function minimizes the problem of a supervisor opening a time clock 101 and then forgetting to close it thereby permitting employees to scan in or out at some later time when the supervisor was not at the time clock 101. Hence, the supervisor must be present during clock processing of the employees, which permits him to verify the clock in and clock out times for each employee as they occur.

After the time clock 101 is opened, the employee or the supervisor is prompted, in state 310, to press either the IN button 140 or the OUT button 142 (FIG. 2a) to either clock in or out. Further, in state 310 other custom messages to the supervisor can be displayed on the LCD display 126 (FIG. 2). Custom messages are entered by the timekeeping department 108 via the timekeeping personal computers 109 (FIG. 1) and are stored in the supervisor's file in the employee master data structure 196 (FIG. 4). When the computer 104 is searching for the supervisor's file in the employee master data structure 196 in decision state 306, it also searches for any messages stored therein. In this way, messages to the supervisor, e.g., asking the supervisor to perform a specific task can be sent directly to the supervisor at the time clock 101. Note, the time clock 101 can also enter state 310 from a transition state 312, labelled B, which is described below in reference to FIGS. 15, 17 and 20 respectively.

The supervisor then determines in decision state 282 whether all of the employees have been processed. If all the employees have been processed, the supervisor scans his ID badge 170 through the slot scanner 130 to close the time clock 101 in state 284 as previously described in reference to FIG. 9. After the time clock 101 has been closed in state 284, it returns to state 302 where the company name, time and date are displayed on the LCD display 126 (FIG. 2).

If the supervisor determines, in decision state 282, that not all of the employees have been processed, either the next employee to clock in or the supervisor depresses the IN button 140 (FIG. 2a) in state 318 thereby initiating a flag, indicating that the time at which the next employee scans his ID card 170 is the time at which this employee is clocking in or beginning his shift. Once the IN button 140 is depressed, the time clock 101 displays, in state 320, the message "PRESS FUNCTION KEY OR SCAN EMPLOYEE BADGE" on the LCD display 126 (FIG. 2). Note, the time clock 101 can also move to state 320 from a transition state 322, labelled C, as discussed with reference to FIGS. 12, 13 and 14 below.

The supervisor then determines, in decision state 324, whether this employee is changing from his usually assigned job to a new job necessitating the recording of a job change for the hours worked by this particular employee in the memory of the computer 104. If a job change is necessary, the supervisor depresses the JOB CHANGE button 152 (FIG. 2), in state 325, causing the time clock 101 to move to a transition state 326, labelled D, which is discussed with reference to FIG. 12 below. If a job change is not necessary, the supervisor then determines, in decision state 328, whether the work the employee will do on this shift is for a special event. If the work to be performed by this employee is for a special event, the supervisor depresses the SPECIAL EVENT button 154 (FIG. 2a) in state 331 causing the time clock 101 to move to a transition state 332, labelled E, which is discussed with reference to FIG. 13 below. If the work is not for a special event, the time clock 101 moves to a transition state 330, labelled F, which is discussed with reference to FIG. 14 below.

Figure 11:
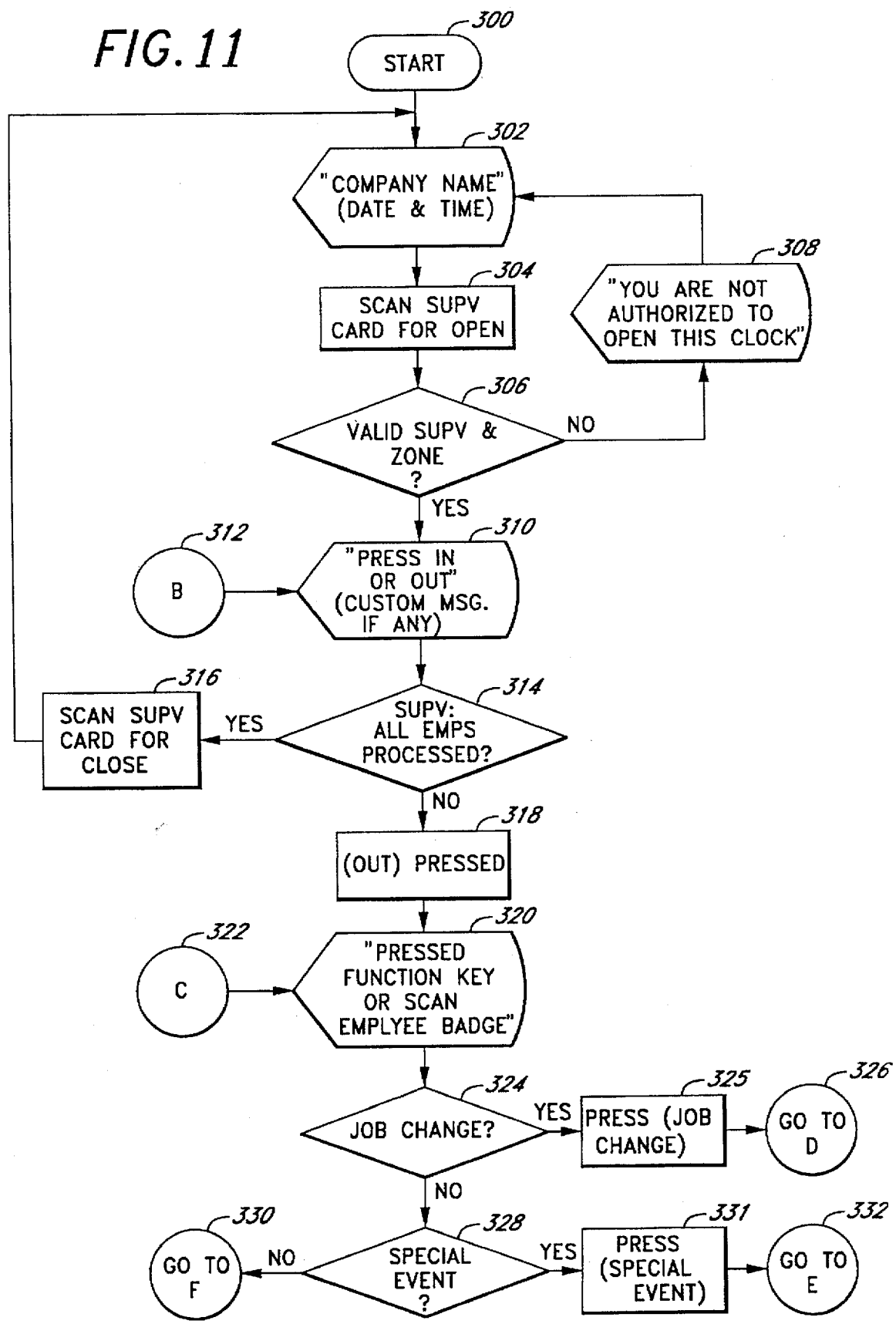
FIG. 11 is a flow diagram of a function performed by a time clock of the time and attendance system shown in FIG. 1 when an employee is clocking out.

FIG. 11 is a flow diagram illustrating the operation of the time clock 101 performing the function of clocking an employee out. This function is almost identical to the clock-in function described in FIG. 10 with the exception that in state 318 the OUT button 142 (FIG. 2a) is depressed thereby initiating a flag indicating that the time at which the next employee scans his ID card 170 is the time at which this employee is clocking out or ending his shift.

Figure 12:
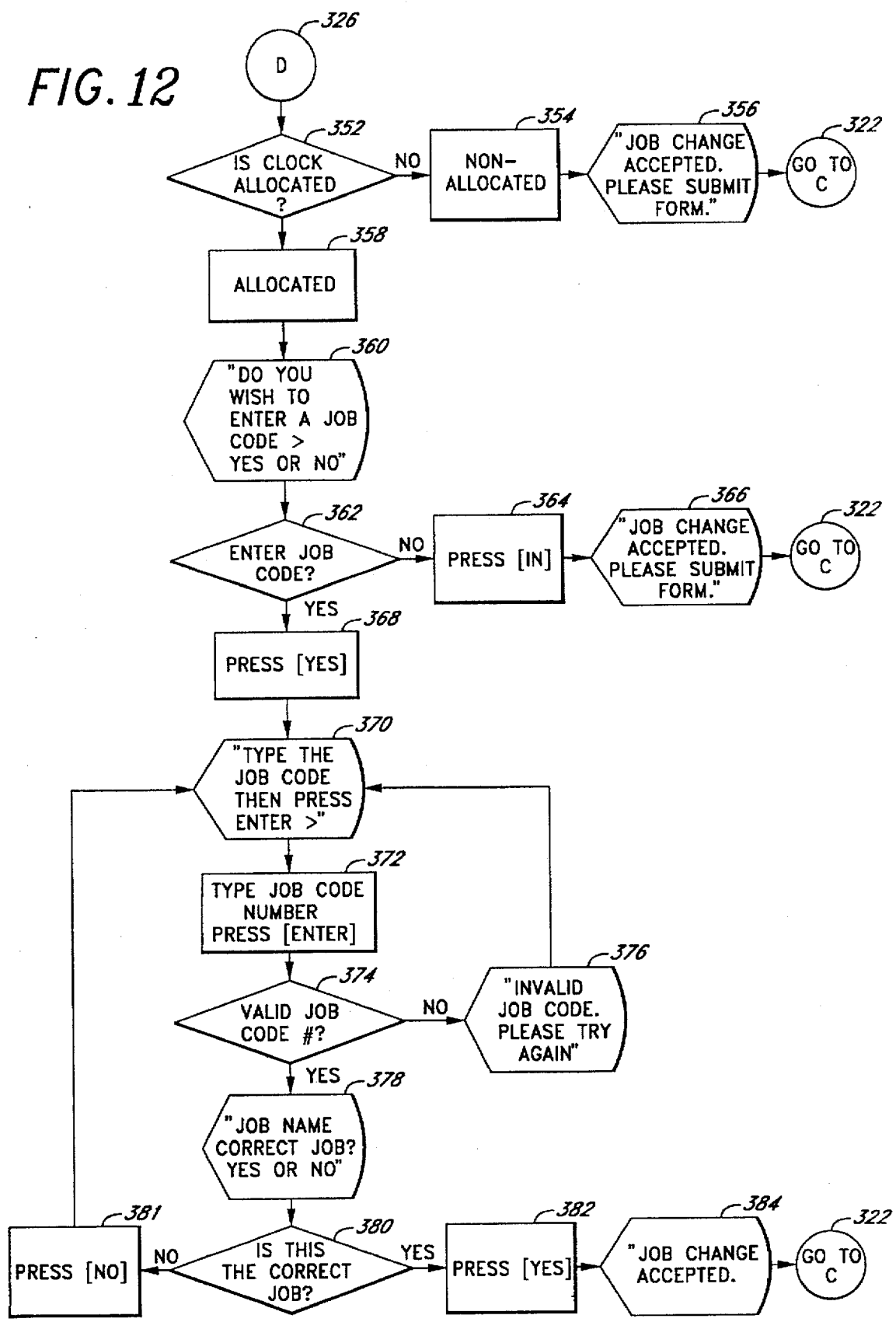
FIG. 12 is a flow diagram of a function performed by the time clock of the time and attendance system shown in FIG. 1 when a particular employee has changed job assignments for a specific work shift while the time clock is performing the basic operation shown in FIG. 9.

FIG. 12 is a flow diagram of the function performed by the time clock 101 when the supervisor depresses the JOB CHANGE button 152 in state 324 (FIGS. 10 and 11). The Job Change function is used when the employee will be or has been working at a different job than his normally assigned job, thereby necessitating different accounting procedures or different pay for the employee. From transition state 326, labelled D (FIGS. 10 and 11), the time clock 101 moves to decision state 352 where a determination is made as to whether the time clock 101 has been allocated to a specific department or division of the workplace. This determination is made by sending a signal to the front end process 190, causing it to search a terminal clock file (not shown) to determine if the time clock 101 is allocated or non-allocated. As previously described, in this preferred embodiment, a time clock 101 can either be programmed to either be allocated or non-allocated.

If the time clock 101 is non-allocated, the front end process 190 sends an appropriate signal in state 354 causing the time clock 101 to display, in state 356, the message "JOB CHANGE ACCEPTED. PLEASE SUBMIT FORM." on the LCD display 125 (FIG. 2). The supervisor is then informed he should fill out the appropriate form for the timekeeping department 108 (FIG. 1) so that they can update their records to account for this job change. As previously discussed, the file server 204 (FIG. 4) uses the information in the clock scan data structure 192 to periodically update the files in the Hours A data structure 206, the Hours B data structure 208, and the Hours C data structure 210. If the time clock 101 is non-allocated, the records in these data structures will not accurately reflect the job assignment to a different department or division. Thus, upon receipt of the appropriate form from the supervisor, the timekeeping department updates the information contained within the Hours B data structure 208 for this employee to reflect the correct department, division and job the employee performed on this work shift. From state 356 the time clock 101 moves to the transition state 322, labelled C, discussed previously in relation to FIGS. 10 and 11.

If, however, the time clock 101 is allocated, then a signal is sent in state 358 by the front end process 190 causing the time clock 101 to display in state 360 the message "DO YOU WISH TO ENTER A JOB CODE > YES OR NO" on the LCD display 126 (FIG. 2). The supervisor then determines, in decision state 362, whether he wants to enter the job code corresponding to the job the employee will be performing. If the supervisor does not want to enter a job code, or does not know it, he depresses the NO button 160 (FIG. 2a) in state 364. From the state 364 the time clock 101 then proceeds to display in state 366, the message "JOB CHANGE ACCEPTED. PLEASE SUBMIT FORM." on the LCD display 126 (FIG. 2). The supervisor then knows that the job change has been accepted, but that he should inform the timekeeping department 108 (FIG. 1) of the job change so that they can update their records, including the hours data structures 206, 208, 210 (FIG. 4), accordingly. The time clock 101 then moves to the transition state 322, labelled C, discussed previously in relation to FIGS. 10 and 11.

If, in decision state 362 the supervisor knows the appropriate job code, he then depresses the YES button 156 (FIG. 2a) in state 368. From state 368 the time clock 101 then displays, in state 370, the message "TYPE JOB CODE NUMBER. PRESS [ENTER]" on the LCD display 176 (FIG. 2). The supervisor then types the job code number of the new job in state 372 using the numerical buttons 146 and the enter button 150 (FIG. 2a).

The time clock 101 then determines, in decision state 374, whether the job code entered is a valid job code number. This determination is made by sending the job code entered in state 372 to the front end process 190 of the computer 104 which validated the number by verifying that it is a valid job code stored in the codes files structure 202 (FIG. 6). If the job code entered in state 372 is invalid, the front end process 190 returns an invalid signal causing the time clock 101 to display, in state 376, the message "INVALID JOB CODE. PLEASE TRY AGAIN" on the LCD display 126 (FIG. 2). From state 376, the time clock 101 then returns to state 370 where the supervisor is again prompted to enter the new job code.

If the front end process 190 determines in decision state 347 that the job code entered in state 372 is valid, it sends a signal to the time clock 101 causing the time clock 101 to display the name of the job e.g., chef or host, that corresponds to the job number entered by the supervisor, and asks the supervisor "CORRECT JOB ? YES OR NO" on the LCD display 176 (FIG. 2) in state 378. The supervisor then determines in state 380 whether the job title displayed in state 378 corresponds to the job he is assigning or has assigned to this particular employee.

If the supervisor determines that the job title does not correspond to the job he is assigning or has assigned, he then depresses the NO button 160 (FIG. 2a) in state 381 causing the time clock 101 to return to state 370 where the supervisor is asked to re-enter the job code. If the supervisor determines, in decision state 380, that the job title corresponds to the job he is assigning or has assigned to this employee, he then depresses the YES button 156 (FIG. 2a) in state 382. The time clock 101 then displays, in state 384, the message "JOB CHANGE ACCEPTED" on the LCD display 126 (FIG. 2). Further, in state 384, the time clock 101 also signals the front end process 190 (FIG. 4) that the hours logged by this employee for this work shift shall be logged in the file for this employee in the clock scan file 192 (FIG. 4) as having been worked in the new job classification.

Subsequently, the file server 204 uses the information in the clock scan data structure 192 to update the information in the Hours data structures 206, 208, and 210 (FIG. 4). The information for this particular employee working this particular shift in the Hours B data structure 208, then reflects that the employee worked the shift in a different job classification, possibly necessitating higher pay. Consequently, accounting changes and pay roll changes resulting from the job change are automatically made by the time and attendance system 100 as the employee is processed without requiring any additional paper work by either the supervisor or the timekeeping department 108.

Figure 13:
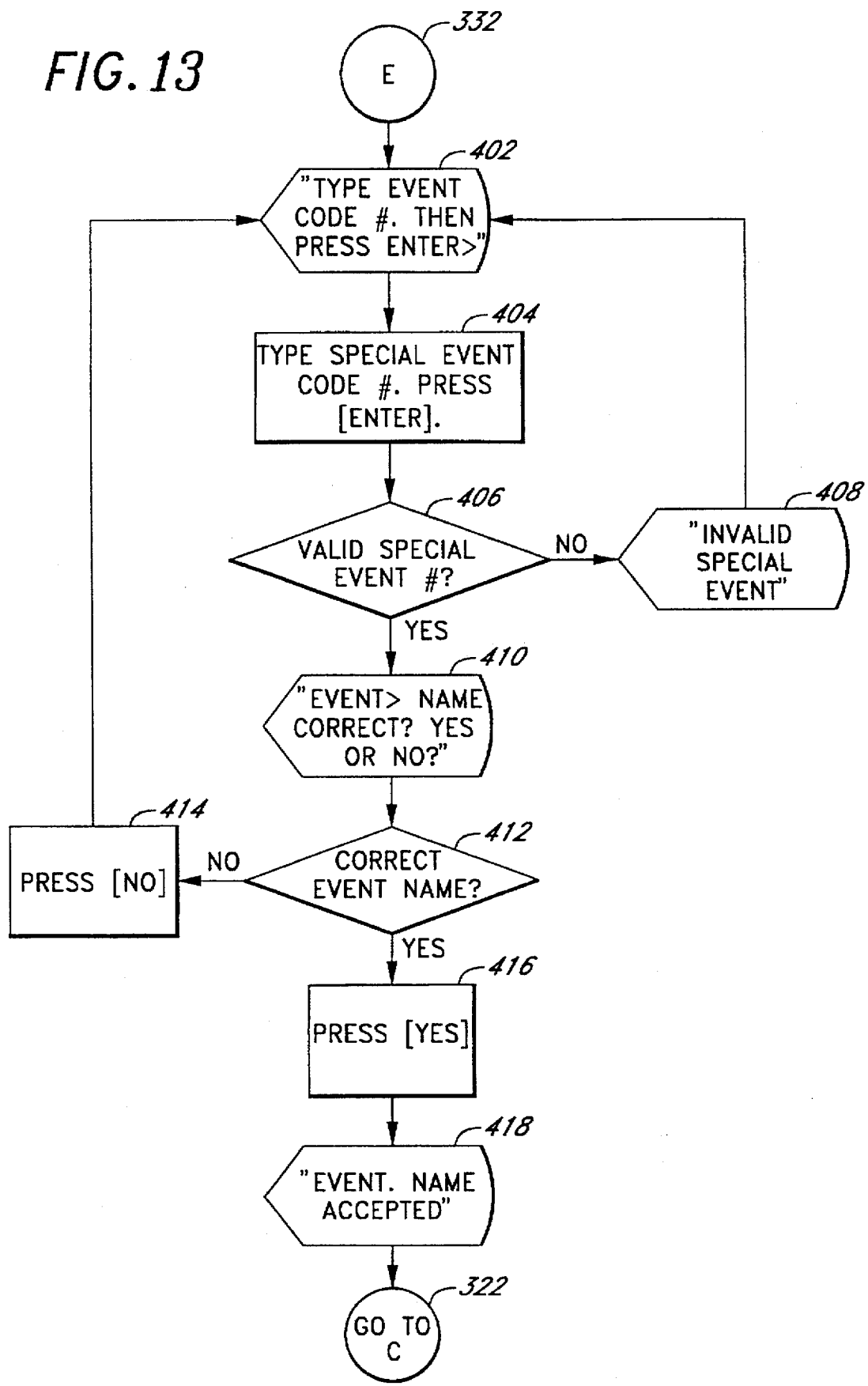
FIG. 13 is a flow diagram of a function performed by a time clock of the time and attendance system shown in FIG. 1 when a particular employee will be working for a special event for which a separate accounting record will be made while the time clock is performing the basic operation shown in FIG. 9.

FIG. 13 is a flow diagram illustrating the operation of a time clock 101 as it performs the special events function called in state 331 (FIGS. 10 and 11). This function permits certain employees to be designated as working on a special event, e.g., an event for which a separate accounting record is desired such as a specific contract or project.

From the transition state 332, labelled E, (FIG. 10 and 11) the time clock 101 proceeds to display, in state 402, the message "TYPE EVENT CODE #. THEN PRESS ENTER>" on the LCD display 126 (FIG. 2). The supervisor then types the special event code number using the numerical buttons 146 and the ENTER button 150 (FIG. 2a) in state 404, to identify the particular special event that the employee is working on.

The validity of the number entered in state 404 is then checked in decision state 406. This determination is made by sending a signal to the front end process 190 causing it to compare the number entered in state 404 to numbers of special events stored in the codes data structure 202 (FIG. 4).

If the special event number entered by the supervisor in state 404 is found by the front end process 190 to be invalid, the front-end process 190 sends a signal to the time clock 101 causing it to display, in state 408, the message "INVALID SPECIAL EVENT" on the LCD display 126 (FIG. 2). After displaying this message, the time clock returns to state 402 where the supervisor is prompted to re-enter the event code number.

If a valid special event number has been entered by the supervisor in state 404, the front end process 190 then sends a valid signal, along with the name of the special event corresponding to the number entered in state 404, to the time clock 101 which in turn displays in state 410 the name of the special event and the prompt "CORRECT ? YES OR NO ?" on the LCD display 126. The name of the special event is retrieved by the front-end process 190 (FIG. 4) from the code data structure 202 (FIG. 6). This ensures that the supervisor is assigning the employees to the correct special event. The time clock 101 then moves to decision state 412 where the supervisor determines whether he has entered the correct special event in state 404. If the supervisor incorrectly entered the special event code in state 404, he then presses the NO button 160 in state 414 causing the time clock 101 to return to state 402 where the supervisor is prompted to retype the special event code number.

If the supervisor entered the correct special event code number in state 404, he then presses the YES button 156 (FIG. 2a) in state 416. The time clock 101 then proceeds to display, in state 418, a message that the special event has been accepted by the supervisor as the correct event to assign the hours worked by this employee on the LCD display 126. In state 418, the time clock 101 also sends a signal to the front end process 190 (FIG. 4) to record the hours logged by this employee in the clock scan data structure 192 as having been worked for the special event corresponding to the number entered in state 404. As discussed previously, the file server 204 (FIG. 4) updates the Hours data structures 206, 208, and 210 as well as additional accounting records with the information in the clock scan data structure 192. Hence, the file server 204 updates files in the memory of the computer 104 containing accounting records for the a special event as including the work performed by this particular employee. From state 418, the time clock moves to the transition state 322 previously described with references to FIGS. 10 and 11.

Figure 14:
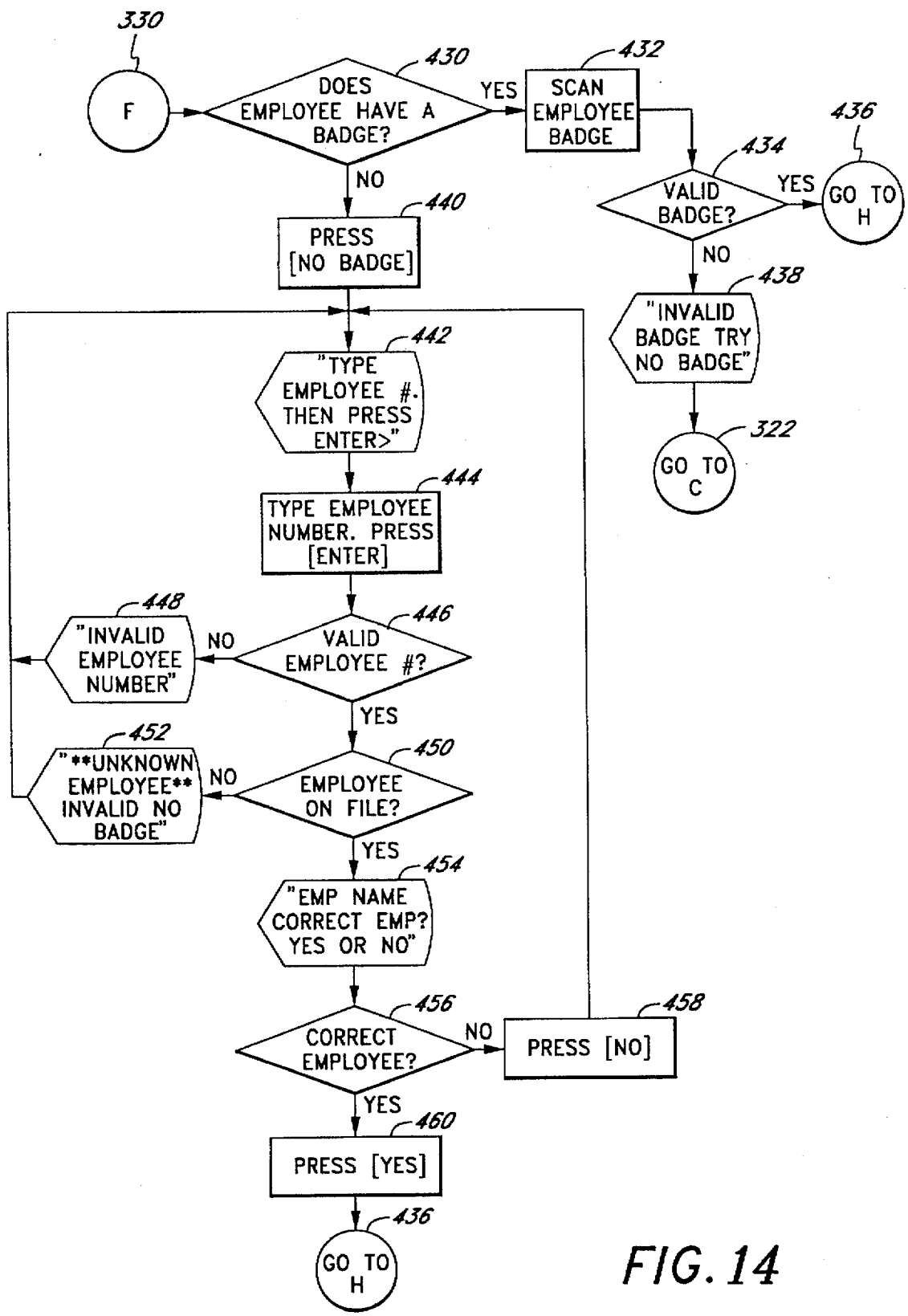
FIG. 14 is a flow diagram of a function performed by a time clock of the time and attendance system shown in FIG. 1 when the employee either clocks in or clocks out with or without his assigned identification badge shown in FIGS. 3a and 3b while the time clock is performing the basic operation shown in FIG. 9.

FIG. 14 illustrates the operation of the time clock 101 as it performs a badge/no badge function. This is the function performed by the time clock 101 when the employee is actually clocking in or out of work by either scanning his ID badge 170 (FIG. 3a and 3b) through the slot scanner 130 (FIG. 2) or by the supervisor manually entering the employee's ID number using the numerical buttons 146 (FIG. 2a).

From the transition state 330, labelled F, described previously in reference to FIGS. 10 and 11, the time clock 101 moves to decision state 430 where it is determined whether the employee presently clocking in or out has an ID badge 170. If the employee has an ID badge 170, the employee slides it through the slot scanner 130 (FIG. 1) in state 432. Hence, in state 432, the bar code 167 of the badge 170 (FIG. 3b) is scanned by the slot scanner 130 (FIG. 2) of the time clock 101 causing the time clock 101 to record the current time.

After the ID badge 170 has been scanned, determined in decision state 434, whether the scanned ID badge 170 is valid. This determination is made by sending a signal to the front end process 190 including the ID number encoded in the bar code 186 (FIG. 3b) of the employee's ID badge 170 which then compares this ID number, to numbers stored in the employee master data structure 196 (FIG. 4). If the ID badge 170 scanned in state 432 is valid, the front end process sends an appropriate signal to the time clock 101 causing the time clock 101 to signal the front end process 190 to store the time recorded in state 432 as the time the employee either clocked in or out. Whether the employee is clocking in or out is dependent upon which flag was initiated in state 318 when either IN button 140 or the OUT button 142 (FIG. 2a) was depressed.

If the employee is clocking in (FIG. 10), then the current time is recorded in the file for this employee in the clock scans data structure 192 (FIG. 4) as the time the employee began his shift. If the employee is clocking out (FIG. 11), then the time at which the employee scanned his ID card 170 is recorded by the front-end process 190 in the employee's file in the clock scans data structure 192 as the time the employee clocked out or ended his shift. Once a clock-in and clock-out time is stored for a particular employee in the clock scan file 192, the file server 204 (FIG. 4) transfers the information for this employee in the clock scan data structure 192 into the files for this employee in the Hours data structures 206, 208 and 210. The time clock 101 then proceeds to transition state 436, labelled H, discussed with reference to FIG. 15 below.

If ID badge 170 is invalid in state 434, i.e., the identification number encoded on the card 170 does not correspond to a current employee, the front end process 190 sends an appropriate signal to the time clock 101 causing it to then display the message "INVALID BADGE TRY NO BADGE", in state 438, on the LCD display screen 126 (FIG. 2). Preferably, the supervisor should then try to input the employee's identification number directly using the numerical buttons 146 (FIG. 2a). From state 438, the time clock 101 moves to a transition state 322, labelled C, discussed previously in reference to FIGS. 10 and 11.

If, in decision state 430, the employee does not have an ID badge 170 that can be scanned into the time clock 101, the supervisor then depresses the NO BADGE button 144 (FIG. 2a) in state 440 causing the time clock 101 to then display on the LCD display 126 (FIG. 2) the message "TYPE EMPLOYEE NUMBER. PRESS [ENTER]," in state 442. The supervisor then types in the employee's ID number using the numerical buttons 146 and the enter button 150 (FIG. 2) in state 444.

The time clock 101 then determines, in decision state 446, whether the number entered in the state 444 is a valid employee number by ensuring that the number entered in the state 494 has the correct number of digits and is in the correct sequence. If the employee number is invalid, then the time clock 101 displays in state 448 the message "INVALID EMPLOYEE NUMBER" on the LCD display 126 (FIG. 2). The time clock 101 then returns from state 448 back to state 442 where the supervisor is prompted to re-enter the employee's identification number.

If, in decision state 446, the employee number is valid, the time clock 101 then proceeds to decision state 450 where it is determined whether there is a currently employed employee assigned to the ID number entered in state 444 in the memory of the computer 104. This determination is made, via the front end process 190, by searching the employee master data structure 196 (FIG. 4) for the employee corresponding to this ID number. If there is no corresponding employee, the front end process 190 sends a signal to the time clock 101 causing it to display the message "UNKNOWN EMPLOYEE  INVALID NO BADGE" on the LCD display 126 (FIG. 2) in state 452. From state 452 the time clock 101 then returns to state 442 where the supervisor is prompted again to enter the employee's number.

If, in decision state 450, there is an employee on file corresponding to the ID number the front end process 190 sends a signal to the time clock 101 causing it to display the name of the employee having the employee number that the supervisor entered in state 444 as well as the message "CORRECT EMPLOYEE ? YES OR NO" on the LCD display 126 (FIG. 2) in state 454. The front end process 190 also sends a signal indicating the name of the corresponding employee found in the decision state 450 to the time clock 101.

The supervisor then determines in decision state 456 whether the name of the employee displayed on the LCD display 126 in state 454 corresponds to the name of the employee who is currently at the time clock 101. If the displayed name is not the name of the employee, the supervisor presses the NO button 160 (FIG. 2a) in state 458 which returns the time clock 101 to state 442 where the supervisor is prompted to enter the employee ID number again. If the name displayed on the LCD display 126 corresponds to the name of the employee at the time clock 101, the supervisor then presses the YES button 156 on the time clock 101 (FIG. 2a) in state 460 causing the time clock 101 to move to the transition state 436, labelled H, which is discussed with reference to FIG. 15 below. Further in state 460, the time clock 101 sends a signal to the front end process 190 causing the front end process 190 to record the current time as the clock in or out time for this employee in the employee's file in the clock scan data structure 192. The signal also causes the front end process 190 to trigger the no badge flag (Table 1) in the employee's file in the clock scan data structure 197.

As can be appreciated, the supervisor must be present at the time clock 101 when the employee is either logging into or out of their work shift. Hence, the supervisor is verifying the presence of the employee contemporaneously with the employee arriving and leaving their work station, thereby eliminating the need for the supervisor to later verify the accuracy of the timekeeping records.

Figure 15B:
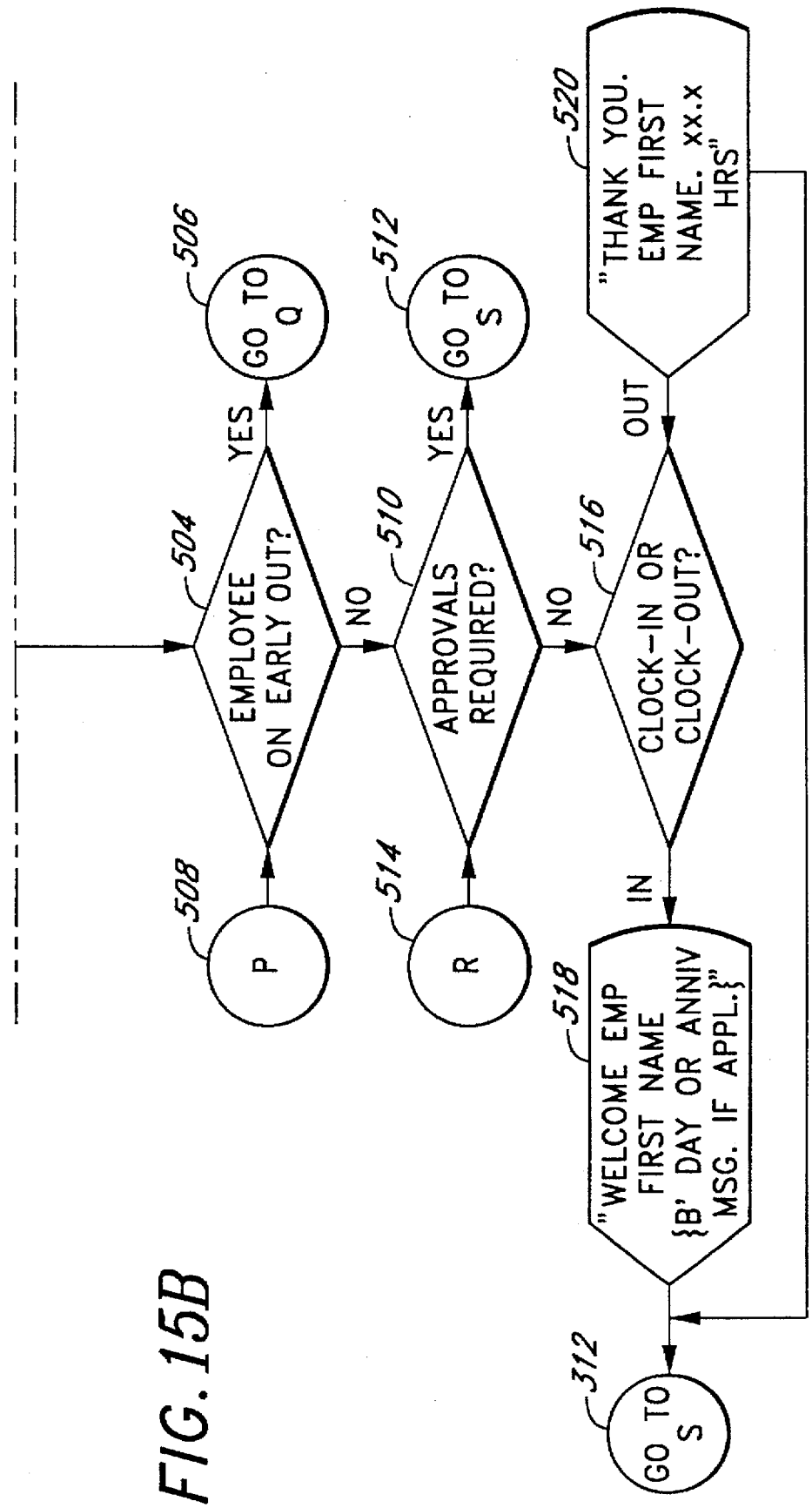

FIG. 15 is a flow diagram illustrating the operation of the time clock 101 as it executes a function which displays stored messages on the LCD display 126 (FIG. 2) about the employee whose ID number has been entered in either states 432 or 444. Further, this function also determines whether certain exceptions, requiring supervisor approval, apply to this particular employee.

From the transition state 436, labelled H, (FIG. 14), the time clock 101 first determines if one of four status messages apply to the particular employee whose ID number was entered in either states 432 or 444. The timekeeping department 108 (FIG. 1) programs these status messages into the employee file in the employee master data structure 196 and the front-end process 190 (FIG. 4) checks this file in response to a signal generated by the time clock 101 indicating that the employee has either logged in or out in states 434 or 460 (FIG. 14). If a status message has been inserted into the employee's file in the employee master data structure 196 (FIG. 4) then the front end process 190 sends to the time clock 101. In this embodiment there are four possible status messages, the employee is on leave, the employee salaried, there is no corresponding employee on file, and the employee has been terminated. The time clock 101 then evaluates the signal provided by the front end process 190 in decision states 472, 476, 480 and 484 to determine which message to display on the LCD display 126.

If the time clock 101 interprets the signal sent from the front end process 190 as indicating that there is no corresponding employee on file in decision state 472, the time clock 101 then displays a message indicating that there is no employee on file corresponding to the ID number entered in state 432 or 444 on the LCD display 126 in state 474. The time clock 101 displays this message for several seconds and then proceeds to decision state 488.

If there is an employee on file in decision state 472, the time clock 101 then moves from decision state 472 to decision state 476. If, in decision state 476, the time clock 101 interprets the signal sent from the front end process 190 as indicating that the employee corresponding to the number entered in state 432 or 444 (FIG. 14) is on leave, the time clock 101 displays a message indicating that the employee is on leave on the LCD display 126 (FIG. 2) in state 478. The time clock 101 displays this message in state 478 for several seconds and then proceeds to decision state 488.

If the employee is not on leave in decision state 476, the time clock proceeds to decision state 480. If, in decision state 480, the time clock 101 interprets the signal sent from the front end process 190 as indicating that the employee corresponding to the number entered in state 432 or 444 (FIG. 14) is salaried, the time clock 101 then displays a message indicating that the employee is salaried on the LCD display 126 in state 482. The time clock 101 continues to display this message in state 478 for several seconds and then proceeds to decision state 488.

If the employee is not on salary in decision state 480, the time clock proceeds to decision state 484. If, in decision state 484, the time clock 101 interprets the signal send from the front end process 190 as indicating that the employee corresponding to the number entered in state 432 or 444 (FIG. 14) has been terminated, the time clock 101 then displays a message indicating that the employee has been terminated on the LCD display 126 in state 486. The time clock 101 continues to display this message in state 486 for several seconds and then proceeds to decision state 488.

In this fashion, the supervisor can be told whether the employee who is logging into the time clock 101 is not on file, on leave, salaried or has been terminated at the time the employee is actually logging in. Hence, the supervisor is then aware of any important changes in status of employees while the employees are standing in front of him at the time clock 101. As can be appreciated, additional messages can also be programmed about particular employees, e.g., the employee is on probation etc., which are then displayed by the time clock 101 in a similar fashion as described above.

If, in decision state 470, it is determined that no status messages apply to this particular employee, the time clock 101 then determines, in a decision state 488, whether the employee is attempting to clock out when he has not clocked in. If the OUT button 142 (FIG. 2a) was pressed in the state 318 (FIG. 11) without the IN button 140 having been previously depressed during the past pre-selected number of hours which, in this case is 17, then the employee's file in clock scan data structure 192 (FIG. 4) is incomplete as it lacks a clock in time. In decision state 488, the time clock signals to the front end process 190 to check if the employee's file in the clock scan data structure 192 has a clock in time. If the clock scan data structure 192 does not have a clock in time, then the time clock 101 moves to a transition state 490, labelled K, described below in reference to FIG. 16.

The time clock 101 then moves from decision state 488 to decision state 492 where it is determined whether the employee corresponding to the identification number entered in either states 432 or 444 (FIG. 14) is authorized to work in the time clock zone corresponding to this particular time clock 101. This determination is made by reviewing the employee's file in the employee master data structure 196, via the front end process 190 (FIG. 4), to determine which time clock zone the employee is authorized to work in, and then comparing this zone to the zone corresponding to this particular time clock 101. If the employee is not authorized to work in this time clock zone, then the time clock 101 moves to a transition state 494, labelled M, discussed below with reference to FIG. 17. Note, the time clock 101 can also enter the decision state 492 from a transition state 496, labelled L, discussed below with reference to FIG. 16.

If it is determined in the decision state 492 that the employee is authorized to work in the time clock zone, then the time clock 101 moves to decision state 498, where it is determined whether the employee is entitled to any overtime pay. This determination is preferably made by the front end process 190 reviewing the summary of earning data and the pay rules for this employee stored within the employee master data structure 196. The employee master data structure 196 is updated periodically, e.g., once a day by the timekeeping department 108, via the interface 212 (FIG. 4) to reflect the current work status of the employees. Typically, overtime is awarded for working more than a standard number of hours for a work shift, working more than a standard number of hours for a work week, or working on holidays. Further, overtime pay is typically higher than the employee's base pay, e.g., one and a half times the employee's typical hourly rate, however, the hourly rate paid for overtime rate may be increased to double or even triple the employee's hourly rate for given circumstances, e.g., working on a holiday etc. The payment of overtime is governed by the aforementioned work rules which may further require the supervisor to authorize the employee to work the overtime hours. If it is determined in decision state 498 that the employee is entitled to overtime and that supervisor approval is required, then the time clock 101 moves to a transition state 500, labelled M, discussed further in reference to FIG. 18 below. Note, the time clock 101 can also enter decision state 498 from a transition state 502, labelled N, discussed further in reference to FIG. 17 below.

If, in decision state 498, the employee is not entitled to overtime, the time clock 101 proceeds to determine, in decision state 504, whether the employee is subject to being on an early out. At some workstations, the workload for a particular employee varies tremendously from day to day, some employees have to work long hours one day, but on the next day, their workload may not be sufficient to keep the employee busy. As a consequence, the employee's supervisor may wish to send the employee home prior to the scheduled end of the employee's shift. The time clock 101 determines in decision state 504, whether the employee (FIG. 14) who is logging out in state 318 (FIG. 11), is subject to being dismissed from work early. The time clock 101 makes this determination by sending a signal to the front end process 190 (FIG. 4) to check to see if the employee's file in the employee master data structure 196 lists the status of this employee as being an employee subject to being dismissed from work early. If the time clock 101 determines that he is subject to an early out, then the time clock 101 moves to a transition state 506, labelled Q, discussed further in reference to FIG. 19 below. Note, the time clock 101 can also enter decision state 504 from a transition state 508, labelled P, described further in reference to FIG. 18 below.

If, in decision state 504, the time clock 101 determines that the employee is not subject to being dismissed from work early, the time clock 101 then proceeds to determine, in decision state 510, whether an exception requiring supervisor approval applies to the employee who is logging in or out in states 437 or 444 (FIG. 14). Exceptions requiring approval of the supervisor include approving the number of overtime hours an employee has worked, and approving the employee leaving work early. Additional exceptions can be programmed by the timekeeping department 109 or Information Systems 106 (FIG. 1). The time clock 101 determines if an exception applies by reviewing the employee master data structure 196 as well as the clock scans data structure 192 stored, via the front end process 190 (FIG. 4). If supervisor approval is required, the time clock 101 then moves to a transition state 512, labelled S, which is further described in reference to FIG. 20 below. Note, the time clock 101 can also enter decision state 510 from a transition state 514, labelled R, discussed with reference to FIG. 19 below.

If, in decision state 510, supervisor approval is not required for this particular employee, the time clock 101 ascertains whether the employee is logging in or out in decision state 516. This determination is made based upon whether the IN button 140 or the OUT button 142 (FIG. 2a) was depressed in state 318 (FIGS. 10 and 11). If the employee is logging in, the time clock 101 moves to state 518 where it displays a message on the LCD display 126 (FIG. 2) welcoming the employee by name to work. The time clock 101 in state 518 also scans the employee master file 196 corresponding to this employee, via the front end process 190 (FIG. 4), to determine if it is the employee's birthday or anniversary. If the current day happens to be a special day such as the employee's birthday or anniversary the time clock 101 then displays an appropriate message on the video display 126 (FIG. 2). The time clock 101 then proceeds from state 518 to the transition state 312, labelled B, discussed previously in reference to FIG. 10 above.

If, the employee is logging out in decision state 516, then the time clock 101 moves to state 520 where it displays a message thanking this particular employee by name as well as displaying the number of hours the employee has worked since logging in on the LCD display 126 (FIG. 2). The number of hours the employee has worked is determined from the file the clock scan data structure 192 for this employee accessed by the front end process 190. From state 520, the time clock 101 moves to a transition state 312, labelled B, discussed previously in reference to FIG. 11 above.

Figure 16:
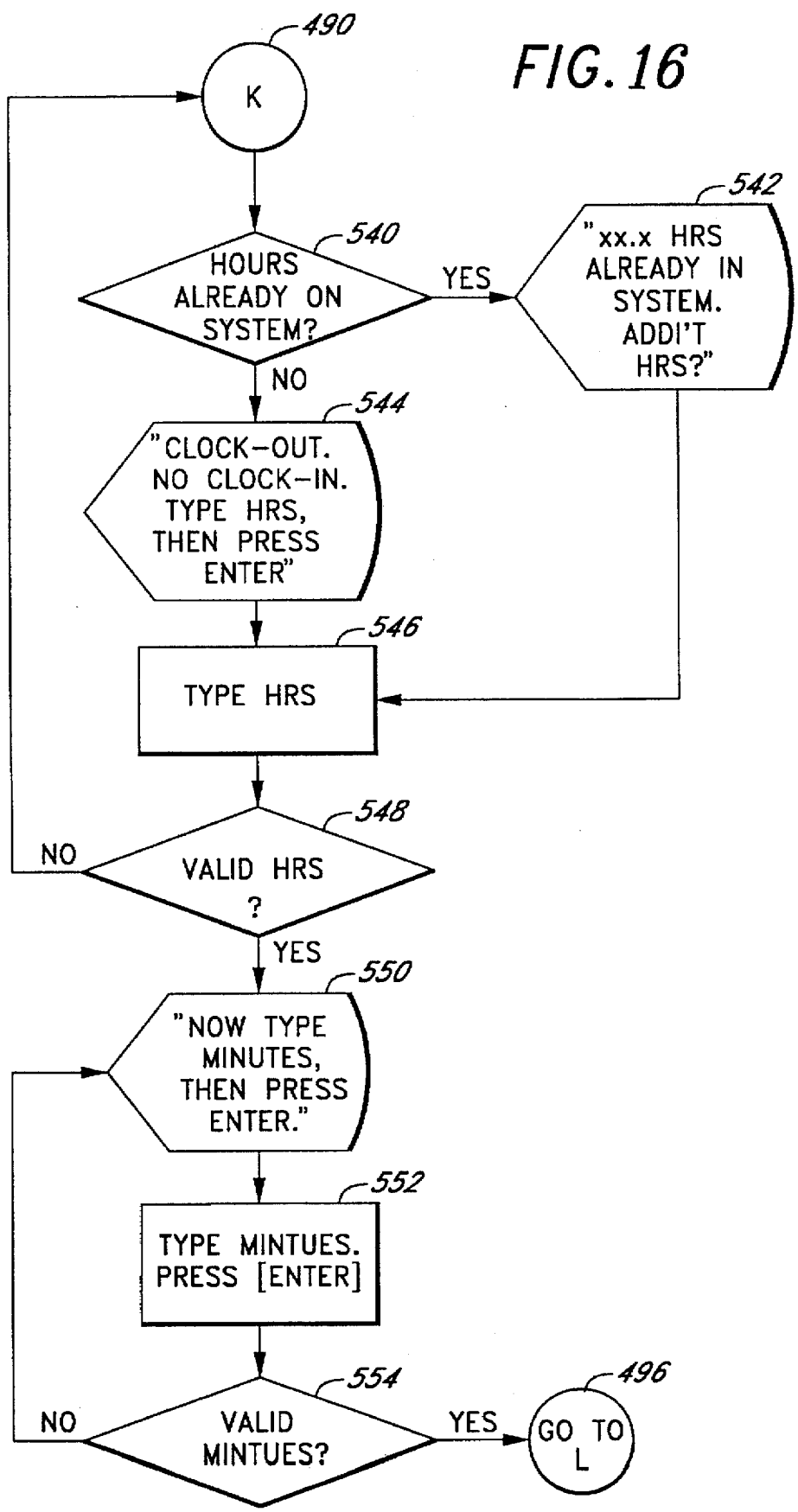
FIG. 16 is a flow diagram of a function performed by the time clock of the time and attendance system shown in FIG. 1 as it executes a CLOCK-OUT/NO CLOCK-IN EXCEPTION function called by the function of FIG. 15.

FIG. 16 illustrates the flow diagram of the time clock 101 as it executes the function called from decision state 488 (FIG. 15) where the time clock 101 determined that the employee logging out in either states 432 or 444 (FIG. 14) failed to log in. From the transition state 490, the time clock 101 determines in decision state 540, whether the employee has already logged hours, i.e., has a completed clock scan, for this particular clock day. This determination is made by sending a signal to the front end process 190 (FIG. 4) to search the clock scan data structure 192 to determine if the employee has previously logged hours on the current day. If the employee has previously worked on the current day, the front end process 190 sends a signal to the time clock 101 that hours have previously been worked on this particular day, as well as indication of the number of hours previously worked.

The time clock 101 proceeds to display, in state 542, a message on the LCD display 126 (FIG. 2) indicating the number of hours that the employee has previously worked on this day and a prompt asking the supervisor to enter any additional hours the employee has worked on this day. The supervisor then types the additional hours the employee has worked in state 546. If there are no hours already recorded for this employee on this particular clock day, then the front end process 80 sends an appropriate signal to the time clock 101 causing it to display the message: "CLOCK-OUT. NO CLOCK-IN. TYPE HRS. THEN PRESS ENTER" on the LCD display 126 in state 540. This informs the supervisor that he should now manually enter the time that the employee has worked that day using the numerical buttons 146 and the enter button 150 (FIG. 2a) in state 546.

Once the supervisor has depressed the enter button 150 in state 546, the time clock 101 proceeds to determine, in decision state 548, whether the hours entered by the supervisor in state 546 are valid. The hours are invalid if the supervisor has entered more than 24 hours, entered more than 2 digits of hours, or typed an invalid number using a non-numerical button in state 546. If an invalid number of hours was entered, then the time clock 101 returns to transition state 490 from which the time clock 101 permits the supervisor to re-enter the hours.

If, in decision state 548, the number of hours entered by the supervisor in state 546 is valid, the time clock 101 then displays in state 550 the message "NOW TYPE MINUTES, THEN PRESS ENTER" on the LCD display 126 (FIG. 2). The supervisor then enters, in state 552, the number of minutes, after the last complete hour, that the employee has worked using the numerical buttons 146 and the enter button 150 (FIG. 2a). If the supervisor does not know the exact number of minutes the employee has worked, then the supervisor simply presses the enter button 150 in the state 552 in which case no minutes after the last full hour are recorded for this employee.

From state 552, the time clock 101 proceeds to verify, in decision state 554, that the number of minutes entered by the supervisor in state 552 is a valid number of minutes. Invalid number of minutes occur when the supervisor has entered more than 59 minutes, more than two digits for minutes or has typed an invalid number using a non-numerical button. If the number of minutes entered by the supervisor in state 552 is invalid, the time clock 101 returns to skate 550 where the supervisor is again prompted to enter the number of minutes the employee has worked. If, the number of minutes entered in state 552 is valid, the time clock 101 then proceeds to a transition state 496, labelled L, discussed previously in reference to FIG. 15. Once valid hours and minutes are entered by the supervisor in states 546 and 552, the time clock 10, sends a signal to the front end process 190 indicative the number of hours and minutes and the front end process proceeds to record them in the file for this employee in the clock scan data structure 192.

The above-described function permits the supervisor to correct the problem of an employee failing to log in to the time clock 101 at the beginning of their shift when he has completed his workshift by entering the amount of time the employee has worked via the numerical buttons 146 (FIG. 2). Consequently, this function minimizes the need for additional paper work by either the supervisor or the employee to correct this failure to log in.

Figure 17:
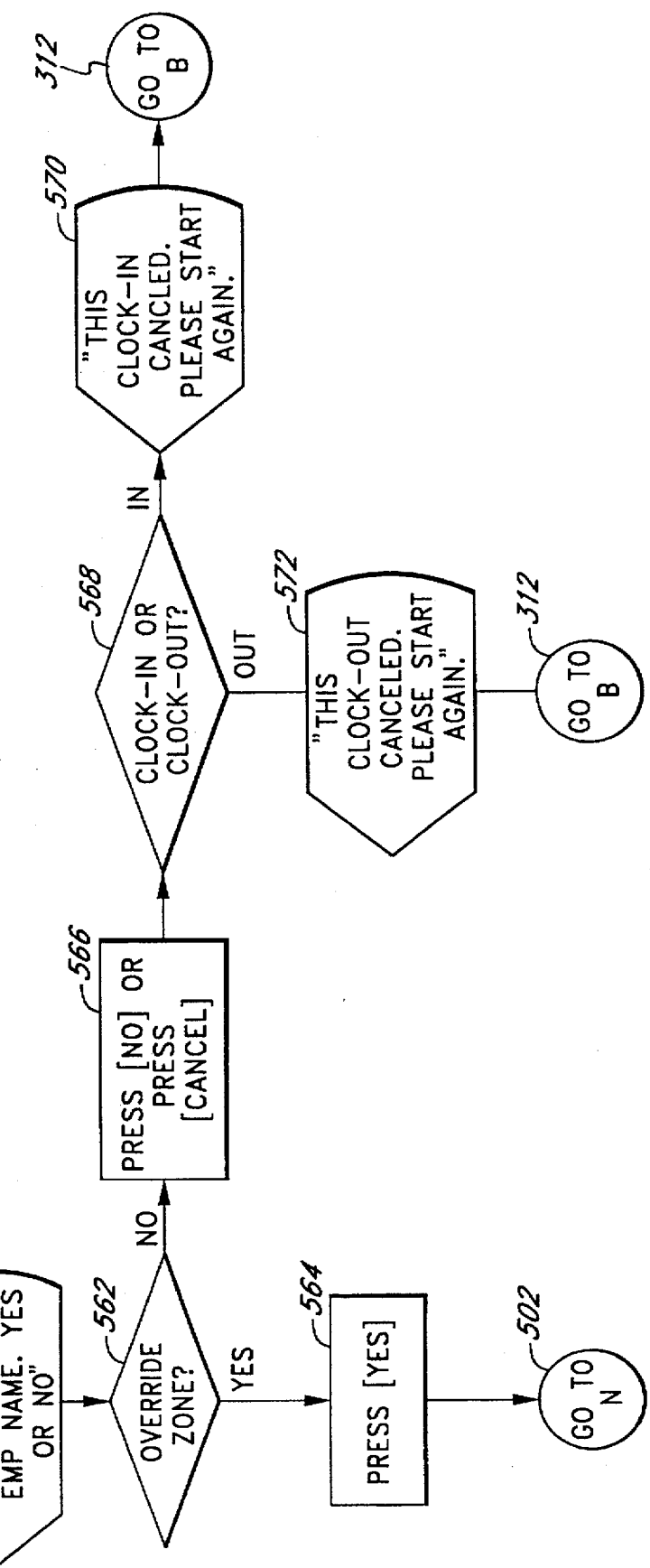
FIG. 17 is a flow diagram of a function performed by the time clock of the time and attendance system shown in FIG. 1 as it executes an INVALID ZONE EXCEPTION function called by the function of FIG. 15.

FIG. 17 illustrates the flow diagram of the time clock 101 as it executes the function called from decision state 492 where it was determined that the employee is logging into a time clock 101 in a zone where the employee is not authorized to work. From the transition state 494, the time clock 101 displays, in state 560, a message that the supervisor must approve this particular employee to work in the time clock zone corresponding to this particular time clock 101 on the LCD display 126 (FIG. 2). Since the time clock 101 requires that the supervisor also be authorized to open the time clock 101 in this area (See, decision state 306 FIGS. 10 and 11), this approval ensures that the supervisor for a particular time clock zone is personally approving the employee to work an otherwise non-authorized shift in the time clock zone.

The supervisor then determines, in decision state 562, whether he wishes to override the zone assignment of the employee and have him work in this particular time clock zone. If the supervisor wants the employee to work in this particular time clock zone, he then depresses the YES button 156 (FIG. 2a) in state 564 causing the time clock 101 to move to a transition state 502, labelled N, discussed previously in reference to FIG. 15. Further, in state 584, the time clock 101, signals the front end process 190 to record in the employee's file in the clock scan data structure 192, that the employee worked the logged hours in a different time clock zone. Subsequently, when the file server 204 updates the Hours B data structure 208 (FIG. 4), the employee's file will then reflect that this shift was worked in a different division or department in a different time clock zone. In this fashion, the supervisor of a particular time clock zone personally authorizes employees, not ordinarily assigned to that zone, to work in the zone. Further, using the time clock 101 to authorize a zone change, also permits records to be kept in the computer 104 (FIG. 1) as to where an employee worked a particular shift.

If, in decision state 562, the supervisor does not want to override the zone assignment of the employee, then the supervisor either presses the NO button 160 or the CANCEL button 158 (FIG. 2a) in state 566. If the supervisor depresses the CANCEL button 158, the time clock 101 returns to the state 310 (Figure or 11). If the supervisor depresses the NO button 160 the time clock 101 then determines, in decision state 568, whether the employee is logging in or out based on whether the IN button 140 or the OUT button 142 was depressed in state 318 (FIGS. 10 and 11). If the employee is logging out, the time clock 101 then proceeds to cancel the clock out and also to display, in state 570, the message "THIS CLOCK-OUT IS CANCELED. PLEASE START AGAIN." on the LCD display 126. From state 570 the time clock 101 returns to the transition state 312, labelled B, discussed previously in reference to FIG. 11 above. If the employee is logging in, the time clock 101 then proceeds to cancel the clock in and also to display, in state 572, the message "THIS CLOCK-IN IS CANCELED. PLEASE START AGAIN." on the LCD display 126. From state 572 the time clock 101 moves to a transition state 312, labelled B, discussed previously in reference to FIG. 10 above.

Figure 18:
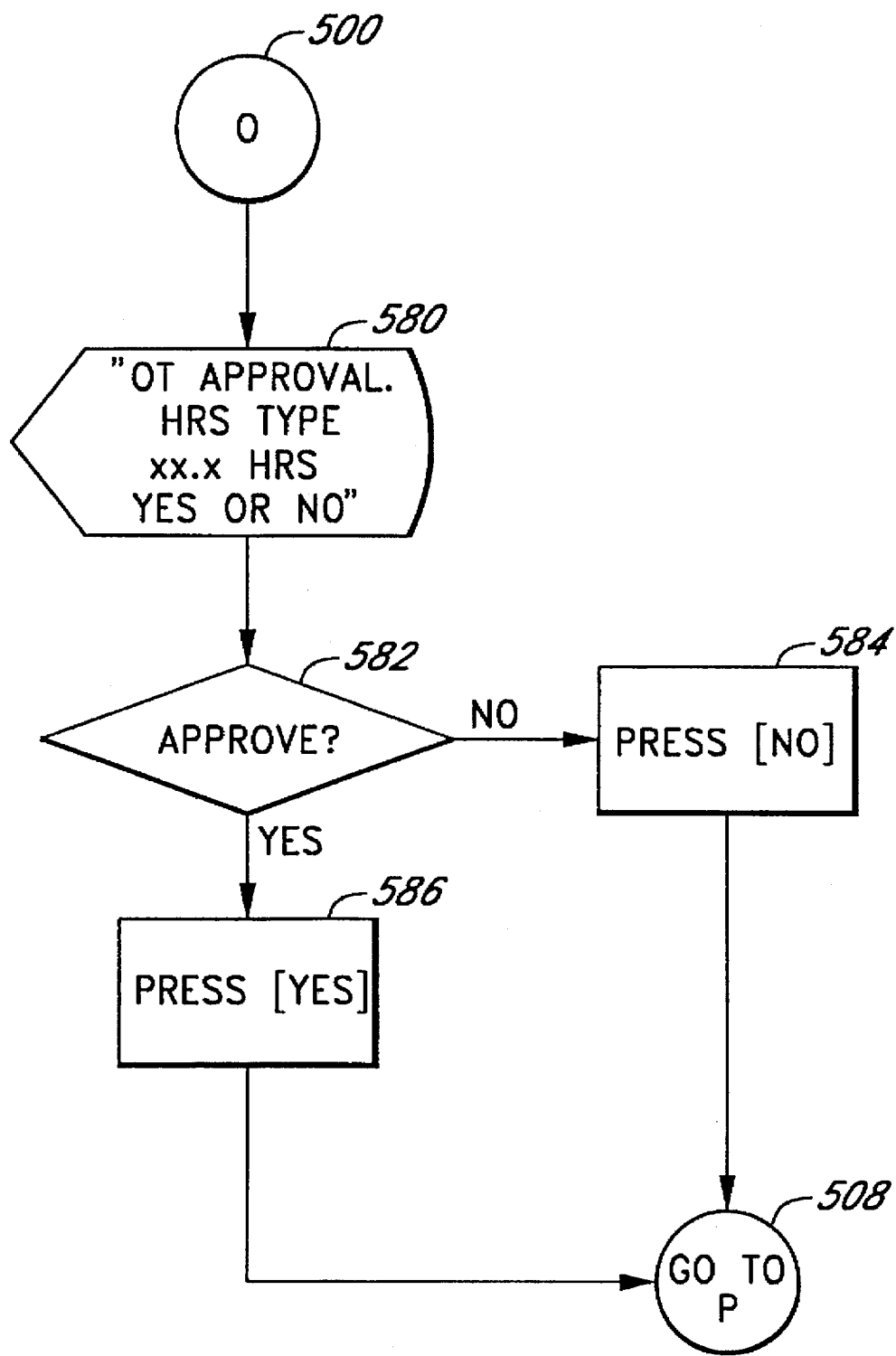
FIG. 18 is a flow diagram of a function performed by the time clock of the time and attendance system shown in FIG. 1 as it executes an OVERTIME EXCEPTION function called by the function of FIG. 15.

FIG. 18 illustrates the function performed by the time clock 101 when it determines, in decision state 498, that the employee clocking in or out is entitled to overtime pay. From the transition state 500, labelled O (FIG. 15), the time clock 101 displays a message on the LCD display 126 (FIG. 2) indicating to the supervisor that he must approve the employee's overtime hours in state 580. This message preferably includes the type of overtime rate, e.g., double time etc., the number of hours that the employee has worked at this rate, as well as a prompt to the supervisor to depress either the YES button 156 or the NO button 160 (FIG. 2a) to approve of disapprove the overtime rate for this employee for the displayed hours.

The supervisor then decides whether to approve the displayed overtime in decision state 582. If the supervisor approves the overtime hours, then the supervisor depresses the YES button 156 (FIG. 2a) in state 586 thereby sending a signal to the time clock 101 that these hours are to be paid at the overtime rate. The time clock 101 then sends a signal to the front end process 190 that the overtime hours are to be paid at the overtime rate which then stores the hours in the employee's file in the clock scan data structure 192 as overtime hours. Subsequently, the file server 204 records the Hours in the employee's file in the Hours B data structure 208 (FIG. 4), in the previously described fashion, permitting the employee to be paid for these hours. From state 586, the time clock 101 then proceeds to the transition state 508, labelled P, which returns the employee to decision state 504 (FIG. 15).

If, the supervisor decides, in decision state 582, not to approve the overtime then the supervisor, in state 584, depresses the NO button 160 (FIG. 2a). The time clock 101 then sends a signal to the computer 104 (FIG. 1) that these hours should not be paid until resolved by the timekeeping department 108, and the front end process 190 then stores these hours in the employee's file in the clock scan data structure 192 as hours not to be paid until resolved. The time clock 101 then proceeds to the transition state 508, labelled P, which returns the time clock 101 to the decision state 504 (FIG. 15).

In this fashion, the supervisor can approve and disapprove payment for overtime work contemporaneously with the employee performing the work. Further, by approving the overtime via the time clock 101, the paper work needed to record these overtime hours for payroll purposes, is all but eliminated.

Figure 19:
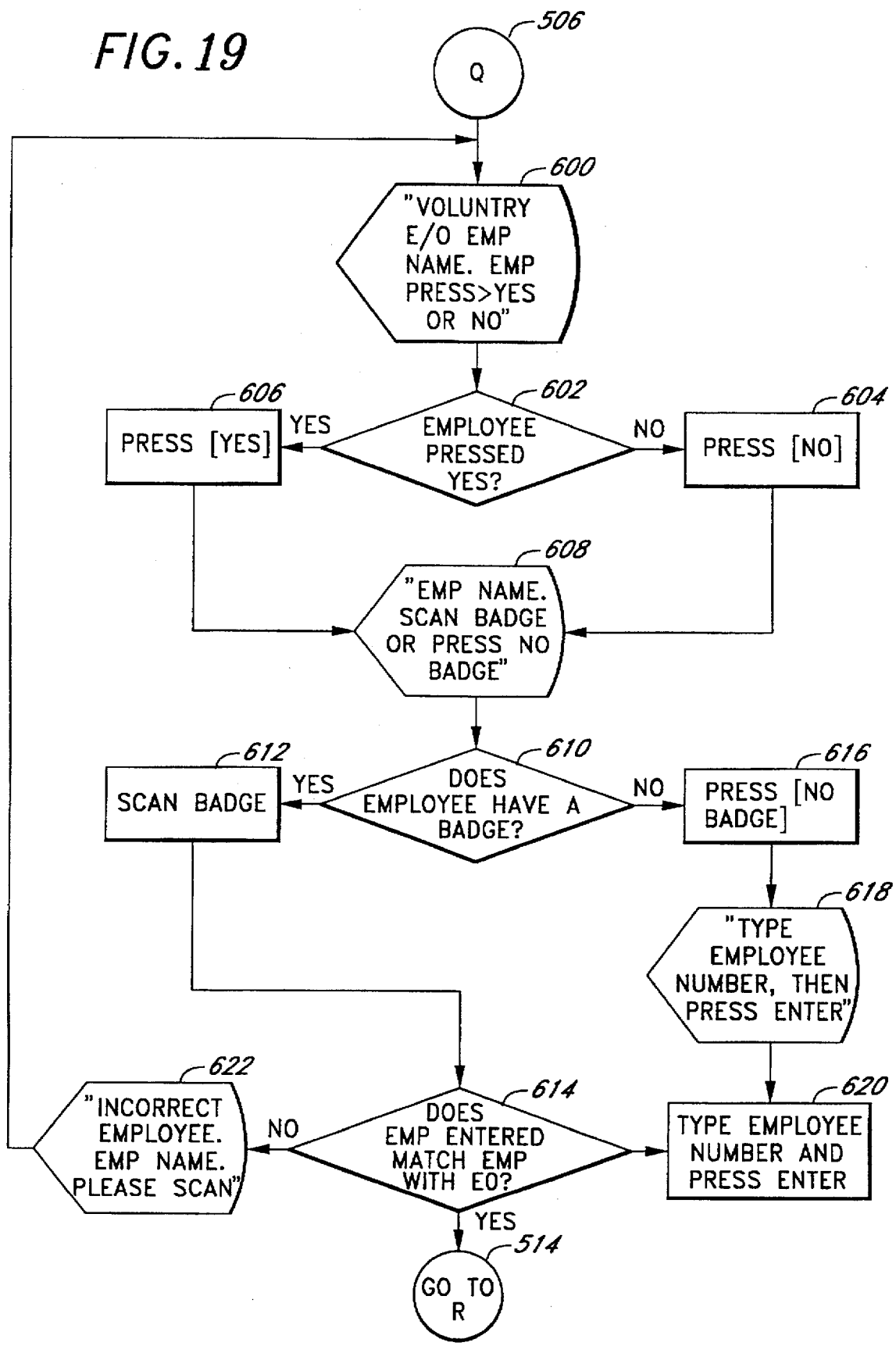
FIG. 19 is a flow diagram of a function performed by the time clock of the time and attendance system shown in FIG. 1 as it executes an EARLY OUT EXCEPTION function called by the function of FIG. 15.

FIG. 19 illustrates the flow diagram of the time clock 101 as it performs the function called in decision state 504 (FIG. 15) where it was determined that an employee who is logging out is subject to an early log out. From the transition state 506, the time clock 101 displays, in state 600, a message on the LCD display 126 (FIG. 2) indicating that the employee with the name corresponding to the identification number entered in the states 432 or 444 (FIG. 14) is being clocked out before his shift is normally scheduled to end. In state 600, the employee is also prompted to depress either the YES button 156 or the NO button 160 (FIG. 2a) to record whether the employee has any objections to being dismissed from work early.

The time clock 101 then proceeds to decision state 602 where the employee determines whether he has any objections to being dismissed from work early. If the employee has no objection, he depresses the YES button 156 (FIG. 2a) in state 606. If the employee has an objection to being dismissed from work early, he depresses the NO button 160 (FIG. 2a) in state 604. The time clock 101 sends a signal to the front end process 190 the decision the employee made permitting the employee to record this information in a memory file of the computer 104. The time clock 101, from either state 604 or 606, then proceeds to state 608 where it displays a message on the LCD display 126 (FIG. 2) prompting the employee by name to either scan his ID badge 170 or press the NO BADGE button 144 (FIG. 2a).

The time clock 101 then proceeds to a decision state 610 where the employee determines whether he has his ID badge 170 with him. If the employee has his ID badge 170, he scans his ID badge 170 through the slot scanner 130 (FIG. 2) in state 612 in the previously described fashion. If the employee does not have his ID badge 170 the employee presses the NO BADGE button 144 (FIG. 2a) in state 616. From state 616 the time clock 101 then proceeds to display, in state 618, the message: "TYPE EMPLOYEE NUMBER. THEN PRESS ENTER". on the LCD display 126 (FIG. 2). The employee then types his employee identification number using the numerical buttons 146 and the ENTER button 150 (FIG. 2) in state 670.

After the employee has either scanned his ID badge 170 in state 612 or has typed his employee number in state 620, the time clock 101 verifies, in decision state 614, that the number entered in either state 612 or state 620 matches the ID number entered previously in either states 432 or 444 (FIG. 14). This ensures that the employee who is approving or rejecting being dismissed from work early is actually the logged in employee who is being dismissed from work early.

If, in decision state 614 the ID numbers do not match, the time clock 101 then displays a message on the LCD display 126 (FIG. 2) indicating that the employee whose name corresponds to the ID number entered in either state 612 or 620 is the incorrect employee. The time clock 101 then returns from state 622 to state 600 where the employee is again prompted to select the appropriate button indicating that he has either approved or disapproved of being dismissed from work early. If, the ID number entered in either states 612 or 620 matches the employee number entered in either states 432 or 444, then the time clock 101 proceeds to the transition state 514, labelled R, which places the time clock 101 in decision state 510 (FIG. 15).

Figure 20:
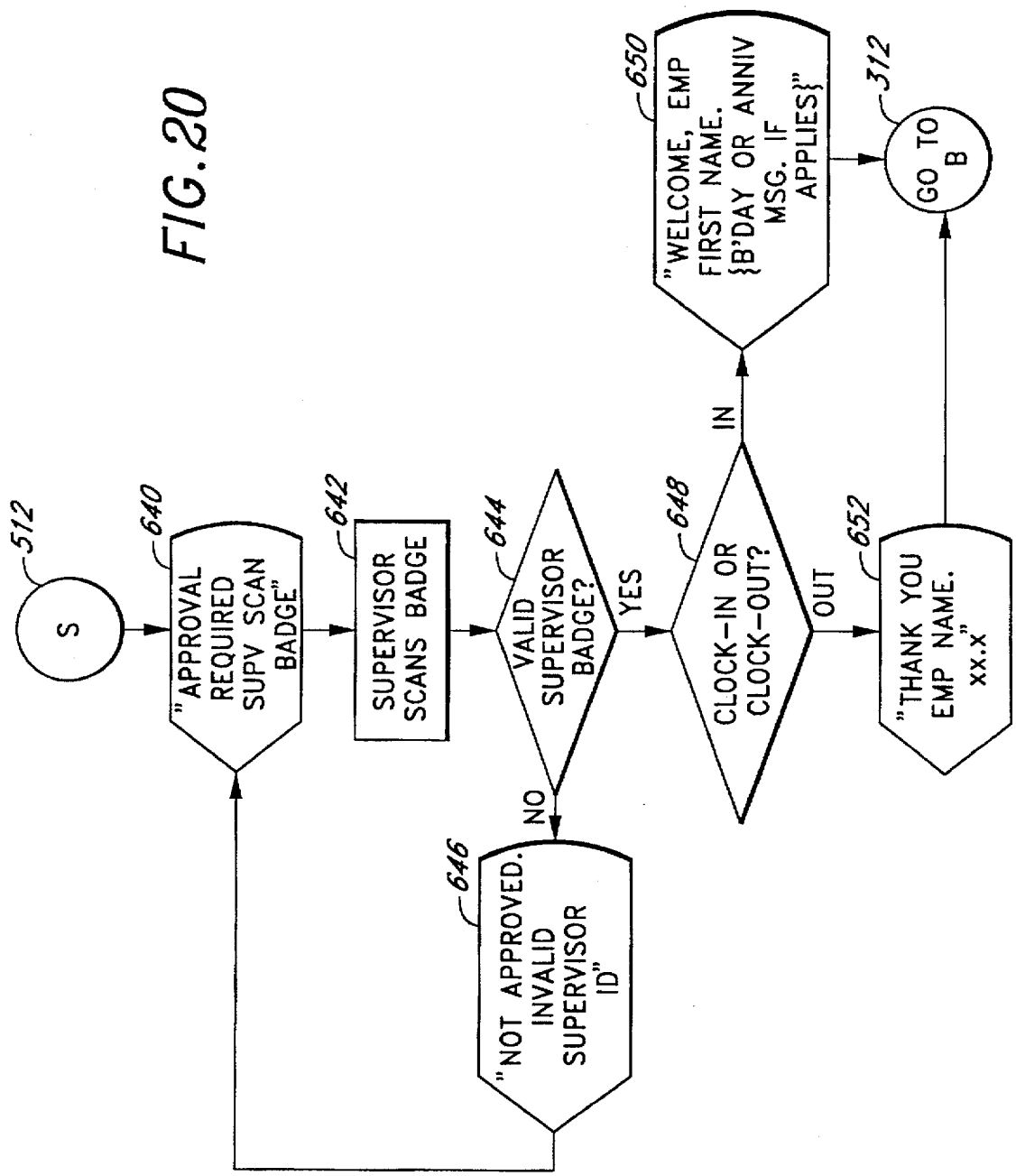
FIG. 20 is a flow diagram of a function performed by the time clock of the time and attendance system shown in FIG. 1 as it executes a SUPERVISOR VERIFICATION function called by the function of FIG. 15.

FIG. 20 illustrates the flow diagram of the time clock 101 as it performs the function called in decision state 510 where it was determined that supervisor approval is required for a particular event relating to the employee who had scanned his ID card 170 in state 432, or had his ID number manually entered in state 444. From the transition state 512, labelled S, the time clock 101 displays, in state 640, the message: "APPROVAL REQUIRED. SUPERVISOR SCAN BADGE" on the LCD display 126 (FIG. 2). The supervisor is then informed that the operation involved with logging this particular employee either into or out of the time and attendance system 100 requires the approval of the time clock zone area supervisor. The supervisor then scans his ID badge 170 (FIG. 3) through the slot scanner 130 (FIG. 2), in state 642, to signify his approval of the exception or operation being performed by the time clock 101.

The time clock 101 then proceeds to verify, in decision state 644, that the supervisor badge scanned in state 642 is valid for this particular area. This verification is done by sending a signal to the front end process 190 (FIG. 4) to determine whether the supervisor corresponding to the identification number encoded on the ID badge 170 scanned in the state 642 corresponds to a supervisor for the time clock zone corresponding to that particular time clock 101. If the supervisor is not authorized for that particular time clock zone, then the time clock 101 displays, in state 646, a message "NOT APPROVED. INVALID SUPERVISOR ID" on the LCD display 126 (FIG. 2). The time clock 101 then returns from state 646 to state 640 where it again prompts the supervisor to scan his card.

If, in decision state 644 the supervisor badge scanned in state 642 is found to be valid, the time clock 101 proceeds to send a signal to the front end process 190 to record the approved item in an appropriate file in the memory of the computer 104. The time clock 101 then moves to decision state 648 where it determines whether this particular employee is logging into or out of the system 100 based upon whether the IN button 140 or the OUT button 142 (FIG. 2a) was depressed in state 318 (FIGS. 10 and 11). If this employee is logging in, the time clock 101 displays, in state 650, a message on the LCD display 126 (FIG. 2) welcoming this employee by name and also displaying any special message such as an anniversary or birthday message if the current day happens to warrant this. As discussed previously, with reference to FIG. 4, the employee's file in the employee master data structure 196 contains information about the employee's birthday and anniversary of when he started work. The front end process 190 searches the employee master data structure 196 in state 650 to determine whether the current day date is either the employee's birthday or anniversary. If it is, then the front end process 190 sends an appropriate signal to the time clock to display an appropriate message.

If the time clock 101 determines, in decision state 648, that the employee is clocking out, the time clock 101 displays on the LCD display 126 a message, in state 652 thanking the employee by name and displaying the number of hours that this employee has worked on this shift. After displaying the message in either state 650 or 652, the time clock 101 moves to a transition state 312 (labelled B) which returns the time clock 101 to the display state 310 (FIGS. 10 and 11). Hence, in this function, the supervisor can approve exceptions applying to a particular employee, e.g., overtime etc., contemporaneously with the employee beginning or completing their shift, without having to fill out any additional paper work.

Figure 21:
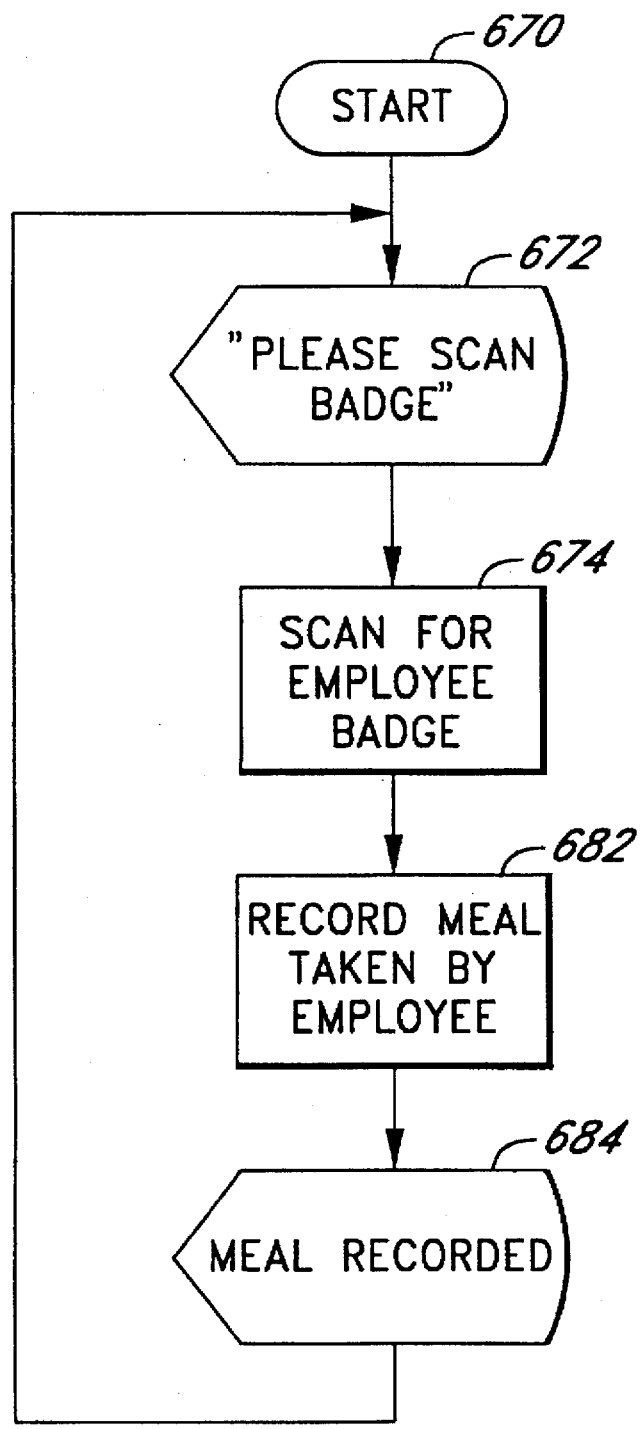
FIG. 21 is a top level flow diagram of a function performed by a meals time clock of the time and attendance system shown in FIG. 1 where an accounting record recording the meals eaten by the employee is updated.

FIG. 21 is a top level flow diagram illustrating the operation of a time clock 101 as it performs a function interactively recording the meals taken by employees from cafeterias in the workplace. As described previously, some of the time clocks 101 are programmed to keep track of the number of meals consumed by employees for accounting purposes. Other than the programming, the time clocks 101 used to keep track of the number of meals consumed by employees, i.e., the meals time clock 101, are identical in all other respects to the time clocks 101 previously described. In this preferred embodiment, the time and attendance system 100 only records the total number of meals taken by eligible employees for accounting purposes. The operation of a time clock 101 in the presently preferred embodiment is as follows.

From a start state 670, the time clock 101 proceeds to display the message "PLEASE SCAN BADGE" on the LCD display 126 (FIG. 2) in state 672. While displaying the word cafeteria, the time clock 101 also scans for an employee's ID badge in state 674. Once an employee has scanned his ID badge 170 through the slot scanner 130 (FIG. 2) of the time clock 101, the time clock 101 then sends a signal to the front end process 190 indicating a meal taken by the employee.

The front end process 190 then records a meal as having been taken in the employee's file in the meals data structure 194 (FIG. 4) in state 682. Further, the front end process 190 also sends a signal to the time clock 101 causing the time clock 101 to display a message indicating that a meal has been recorded on the LCD display 126 (FIG. 2) in state 684. After this message is displayed, the time clock 101 returns to displaying the word cafeteria in state 672 and waiting for the next employee to scan his ID badge 170 in state 674. Hence, the meals time clock 101 is always triggered and awaiting the next employee to scan their ID badges 170.

As can be appreciated, the meals time clocks 101 can be modified to permit a supervisor or a cashier to enter the value of the meal taken using the numerical buttons 146 (FIG. 2) permitting the time and attendance system 100 to keep a more accurate accounting record of the cost of operating the cafeteria. Further, the time and attendance system 100 can also be modified to permit the employee to be charged for the meals he has taken, either by a payroll deduction or by periodically generating a bill for the employee. Still further, the time clocks 101 and the computer 104 of the time and attendance system can be further modified in a similar fashion to permit any purchases by the employee, e.g., in a company store etc., to be accounted for and conceivably charged to the employee or to permit only selected employees to use the cafeteria or stores.

The foregoing description describes an integrated time and attendance system 100 which automatically records the clock in and clock out times for hourly employee at time clocks located in work zones adjacent to the employee's work stations. The clock in and clock out times are then sent to a central computer thereby minimizing the need and cost of additional entry of these hours into either account ledgers or a computerized system.

The time clocks only process employees after a supervisor has opened a time clock. This ensures that a supervisor is present to verify that each employee has worked his assigned shift thereby minimizing the need for the supervisor to review the time entry records of each of his employees. Further, the presence of the supervisor enables the supervisor to make new job assignments for individual employees directly at the time clock which are then automatically recorded in the central computer.

The central computer can then automatically generate accounting records incorporating these changes without requiring any additional supervisor review of records or time entry by a timekeeping department. The time clocks are also capable of receiving information and displaying messages generated by the central computer. This permits the central computer to send signals to the time clock about particular employees. Further, these signals can include seeking supervisor authorization or employee authorization for various job assignments, overtime pay and the like.

These time clocks can also be programmed to not just record the clock in and clock out times for employee's beginning their shifts, they can also be programmed to receive information such as employee's use of cafeterias and transmit this information into accounting files in the central computer.

Requiring the supervisor to be present to open and close the time clock also enhances communication between management and employees by ensuring that the supervisor is present to receives messages from the central computer about specific employees who are clocking in and out of work. Further, the supervisor is also able to respond to queries formulated by the central computer, e.g., approval of overtime etc. Finally, requiring the supervisors to open and close time clocks also enhances communication between the management and the hourly workers.

Information received by the central computer from the time clocks 101 is then organized into a plurality of data structure which are then used to generate reports, payroll checks and the like. The central computer is also programmed to evaluate files for individual employees for conditions necessitating supervisor action, e.g., the employee has worked enough time to be eligible for overtime requiring supervisor approval. Finally, the central computer is also accessible to other systems permitting information to be downloaded to update files. Ultimately then, the foregoing discussion describes an integrated accounting system which minimizes paper work by interactively linking employees, supervisors and the computerized accounting system at a time clock each time the employee begins and finishes his shift.

Although the above detailed description has shown, described and pointed out the fundamental novel features of the invention as applied to various embodiments, it will be understood that various omissions and substitutions and changes in the form and details of the device illustrated may be made by those skilled in the art, without departing from the spirit of the invention.

What is claimed is:

1. A time and attendance system for accumulating and processing information about a plurality of employees in a workplace having workstations where employees perform assigned tasks under the supervision of one or more supervisors, wherein the time and attendance system is comprised of:

a time clock configured to allow one or more employees to log in and log out and to generate one or more data signals indicative thereof, wherein the time clock has an open state and a closed state and wherein the one or more data signals indicative of when an employee logged in or out of the time clock are generated only when the time clock is in the open state and wherein the time clock only enters the open state in response to a supervisor opening the time clock;

a central computer electronically linked to the time clock and receiving the data signals from the time clock wherein the computer stores information indicative at least in part of the data signals generated by the time clock; and a plurality of data structures corresponding to the plurality of employees, wherein the central computer stores information by updating the plurality of data structures in response to the one or more data signals received from the time clock.

2. The system of claim 1, wherein the time clock includes a card reader and wherein the time clock only enters the open state in response to a supervisor scanning an appropriately encoded card through the card reader.

3. The system of claim 2, wherein the time clock generates the one or more data signals in response to an employee scanning an appropriately encoded card through the card reader to signify that the employee is either logging in or out.

4. The system of claim 3, wherein the time clock includes a display screen and a plurality of buttons, and wherein depression of the buttons results in additional data signals being sent to the central computer.

5. The system of claim 4, wherein the additional data signals include a signal indicative of an employee clocking in and clocking out, and the time at which the employee clocked in and out.

6. The system of claim 5, wherein the central computer provides signals to the time clock and wherein the display on the time clock displays a message on the display screen indicating that the employee has a predefined status in response to receiving a status signal from the central computer indicating that the status of the employee is one of a plurality of predefined statuses.

7. The system of claim 6, wherein the predefined statuses includes a status indicating that an employee is on leave of absence.

8. The system of claim 7, wherein additional information about the employee who is logging in or out can be sent to the central computer by depressing at least one of the plurality of buttons on the time clock.

9. The system of claim 8, wherein the central computer, in response to receiving a data signal from the time clock indicating that an employee is logging in, reviews the data structure corresponding to the employee to ascertain the employee's overtime status and, upon ascertaining that the employee is entitled to overtime pay, sends a signal to the time clock requesting that the supervisor approve the overtime.

10. The system of claim 9, wherein the supervisor approves the overtime by depressing an appropriate button on the time clock so that the time clock sends a signal to the central computer indicative of the supervisor's approval of the overtime.

11. The system of claim 10, wherein the central computer, in response to receiving the signal indicative of the supervisor's approval of the overtime, updates the data structure corresponding to the employee to indicate that the employee is entitled to an overtime pay rate.

12. The system of claim 8, wherein the central computer, in response to the supervisor depressing a selected one or more of the plurality of buttons on the time clock, updates the data structure corresponding to the employee to indicate that the employee will work a shift at a new job and wherein the central computer stores a record of the hours worked by the employee as having been worked at the new job.

13. The system of claim 8, wherein the central computer, in response to the supervisor depressing a selected one or more of the plurality of buttons on the time clock, updates the data structure corresponding to the employee to indicate that the employee is assigned to work on a special event and wherein the computer stores a record of the hours worked by the employee in the data structure as having been worked on the special event.

14. The system of claim 1, wherein each of the plurality of data structures corresponding to each employee contains information about an employee including the hours worked during a current pay period, the pay rate for the hours worked, and the job performed by the employee for the hours worked.

15. The system of claim 14, further comprising a payroll system having access to the information within the plurality of data structures which uses the information stored within the plurality of data structures to generate payroll checks for the employees.

16. In a time and attendance system comprising one or more time clocks configured to provide signals indicative of an employee logging in and out, and a central computer, with an associated memory, which receives signals from the one or more time clocks, a method of interactively accumulating and processing accounting information for the employees in a workplace comprising the steps of:

a supervisor manipulating a first time clock so as to place it in an open state;

an employee logging in or logging out by manipulating the first time clock only after the supervisor has manipulated the first time clock into the open state;

transmitting a signal to the central computer indicative of the time the employee logged in or out; and storing information corresponding to the employee in a data structure in response to the signal received by the central computer which is indicative of the employee logging in or out.

17. The method of claim 16, wherein the step of a supervisor manipulating a first time clock comprises scanning an appropriately encoded card through a card reader associated with the first time clock.

18. The method of claim 17, wherein the step of an employee logging in or out comprises the step of the employee scanning an appropriately encoded card through a card reader associated with the first time clock.

19. The method of claim 18, further comprising the steps of:

recording the log in or log out time of the employee in a data structure corresponding to the employee in response to the employee scanning their card through the card reader;

determining the employee's status in response to the employee scanning their card through the card reader by reviewing information stored in the data structure corresponding to the employee; and displaying a message to the supervisor on a display associated with the card reader to obtain supervisor approval of a change of status for the employee.

20. The method of claim 19, wherein the step of determining the employee's status comprises determining whether the employee is entitled to overtime and the step of displaying the message comprises displaying a message seeking supervisor approval of the employee receiving overtime.

21. The method of claim 20, further comprising the step of recording, in a data structure corresponding to the employee, information indicating that the employee should receive an overtime pay rate for the hours worked subsequent to receiving supervisor approval.

22. The method of claim 19, wherein the step of determining the employee's status comprises determining whether the employee is being assigned a new job assignment.

23. The method of claim 22, further comprising the step of recording, in a data structure corresponding to the employee, information indicating that the employee worked in the new job assignment subsequent to receiving supervisor approval.

24. The method of claim 16, further comprising the step of the supervisor closing the time clock after the employee has logged in or out of work.

* * * * *